United States Patent
Shibata et al.

(10) Patent No.: US 6,665,566 B1
(45) Date of Patent: Dec. 16, 2003

(54) ELECTRIC CONTROL APPARATUS OPERABLE ON OBJECT-ORIENTED PROGRAM

(75) Inventors: Kenji Shibata, Nagoya (JP); Shigeru Kajioka, Kariya (JP); Kenji Suganuma, Toyokawa (JP); Seiya Nakayama, Kariya (JP)

(73) Assignee: Denso Corporation, Aichi-Pref. (JP)

(*) Notice: Subject to any disclaimer, the term of this patent is extended or adjusted under 35 U.S.C. 154(b) by 0 days.

(21) Appl. No.: 09/475,676

(22) Filed: Dec. 30, 1999

(30) Foreign Application Priority Data

Jan. 20, 1999 (JP) .......................... 11-012002

(51) Int. Cl.[7] .......................... G05B 19/18; G06F 15/16
(52) U.S. Cl. .................. 700/7; 700/2; 700/11; 700/19; 700/23; 709/206; 709/207; 709/236; 709/315; 701/36; 701/48; 701/91
(58) Field of Search .......................... 700/2, 7, 11, 19, 700/23; 701/36, 48, 91; 709/206, 207, 236, 315

(56) References Cited

U.S. PATENT DOCUMENTS 5,548,760 A * 8/1996 Healey .................. 709/314
5,801,938 A * 9/1998 Kalantery .................. 700/2
5,812,390 A * 9/1998 Merkin .................. 700/2
5,826,095 A * 10/1998 Jordan .................. 700/2
5,844,794 A * 12/1998 Keeley .................. 700/7

FOREIGN PATENT DOCUMENTS

EP  0 892 342 A2  1/1999

* cited by examiner

Primary Examiner—Paul P. Gordon
Assistant Examiner—Thomas Pham
(74) Attorney, Agent, or Firm—Nixon & Vanderhye PC

(57) ABSTRACT

An electronic control apparatus is designed to perform an engine control program in an object-oriented programming manner. A first type message, which does not contain a count value generated as a result of execution of a method of an object, is stored in a message storage unit. At the time that execution of the method is completed, the stored first type message is read out and a method of the object corresponding to the destination of the message is executed. A timer message, which contains a count value generated as a result of execution of the method of the object, is stored in another storage unit. The count value (timer counter) of the timer message in the other storage unit is reduced one by one as a result of the process being performed every predetermined time. When the count value of the timer message reaches 0 in the message storage unit the message is re-stored as a first type message.

6 Claims, 18 Drawing Sheets

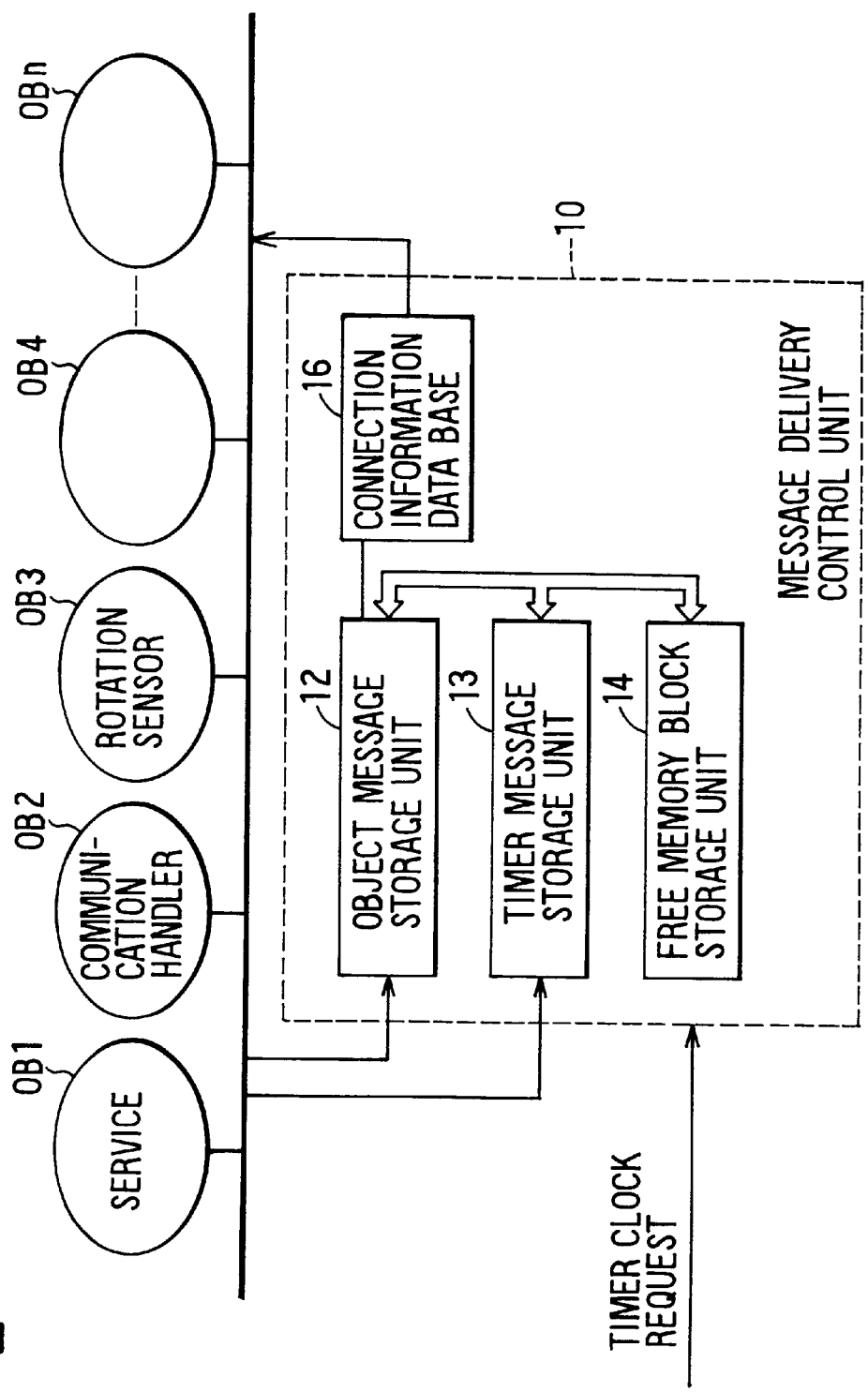

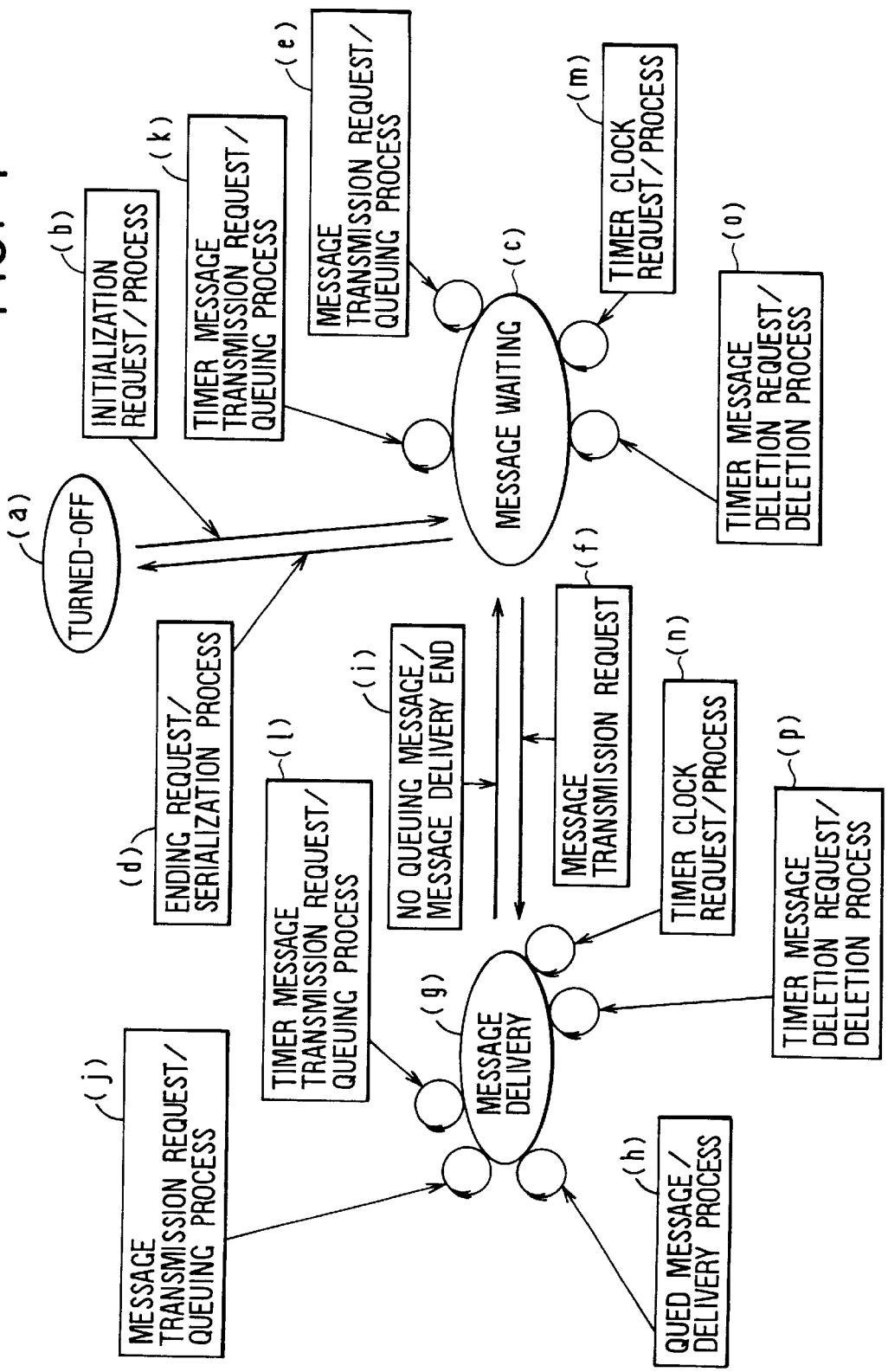

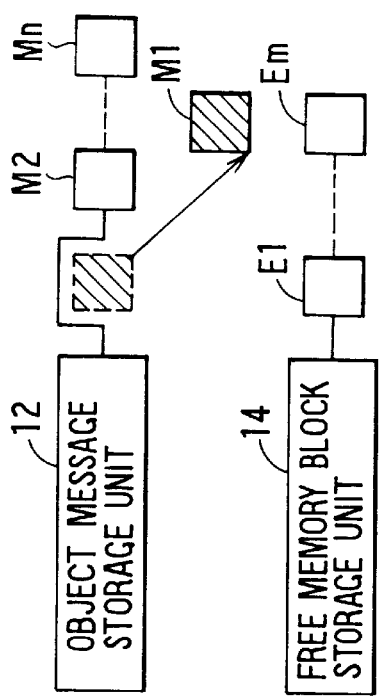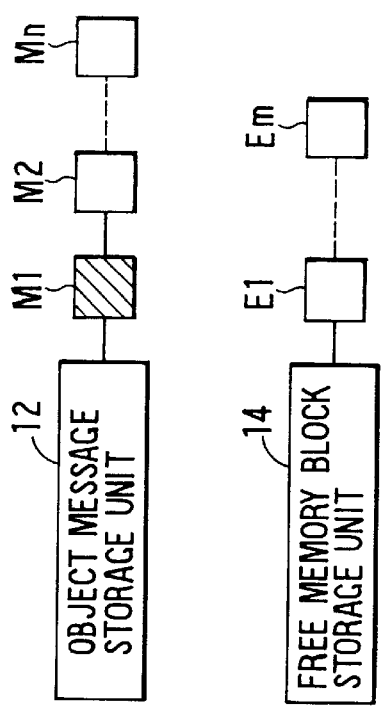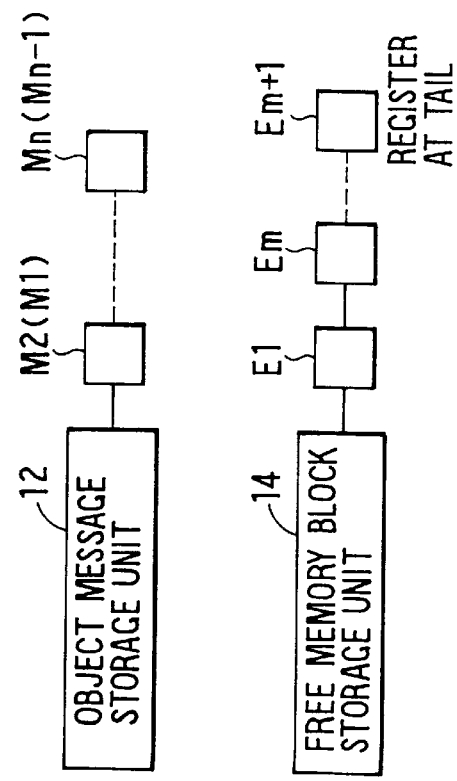

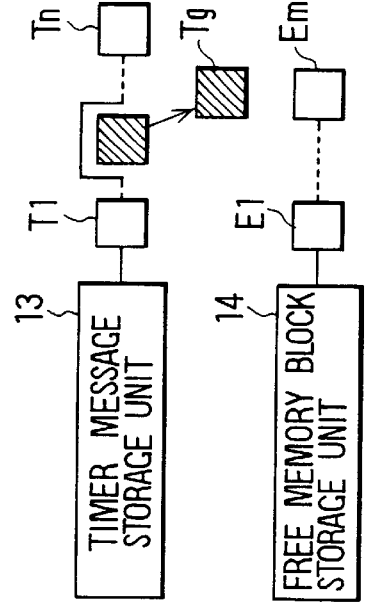
FIG. 16A
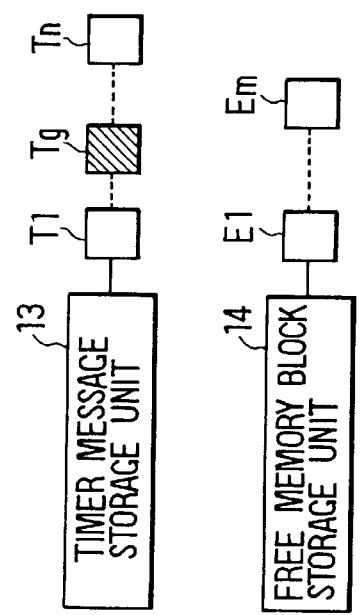
FIG. 16B
FIG. 16C
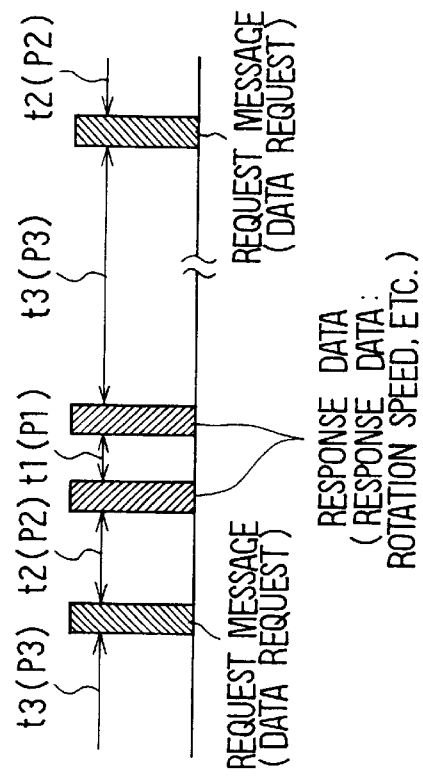
FIG. 17
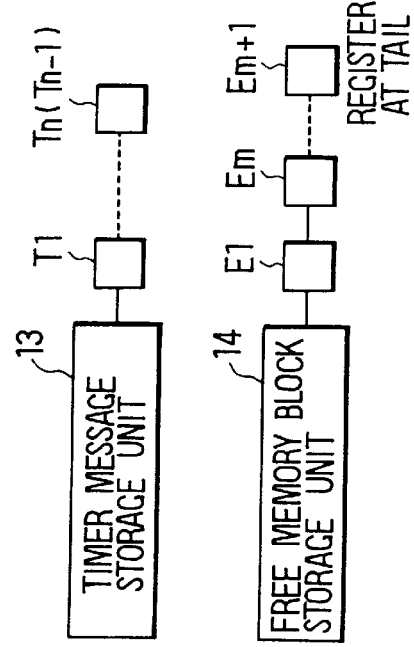

| OBJECT | OID | METHOD | MID |
|---|---|---|---|
| SERVICE | 1 | REQUEST MESSAGE RECEPTION NOTICE PROCESS | 1 |
| | | RESPONSE MESSAGE ACQUISITION PROCESS | 2 |
| | | ROTATION SPEED STORAGE PROCESS | 3 |
| COMMUNICATION HANDLER | 2 | RECEPTION WAIT PROCESS | 1 |
| | | TESTER READ PROCESS | 2 |
| | | RESPONSE START PROCESS | 3 |
| | | TRANSMISSION PROCESS | 4 |
| ROTATION SENSOR | 3 | ROTATION SPEED ACQUISITION PROCESS | 1 |

ELECTRIC CONTROL APPARATUS OPERABLE ON OBJECT-ORIENTED PROGRAM

CROSS REFERENCE TO RELATED APPLICATION

This application relates to and incorporates herein by reference Japanese Patent Application No. 11-12002 filed on Jan. 20, 1999.

BACKGROUND OF THE INVENTION

1. Field of the Invention

The present invention relates to an electronic control apparatus to control a control target in accordance with an object-oriented program.

2. Related Art

In an electronic control apparatus for controlling a vehicle engine program, executed by a microcomputer (specifically, a CPU of a microcomputer), is proposed for each type of engine control. For example, relating to fuel injection control, a program has been devised for each type of control, such as ordinary injection control synchronized to engine rotation speed, injection control asynchronous with engine rotation speed, or fuel cutoff control during high rotation. There are numerous common portions in each program.

It is therefore proposed in U.S. patent application Ser. No. 09/104,967 (EP 0892 342 A2) to devise a control program (perform programming) by an object-oriented approach, similarly to a case of a personal computer or the like, in an electronic control apparatus of this type as well. Here, an object is a software module uniting data and a program (method) which is a procedure to process this data. With object-oriented programming, all functions of a control program are subdivided into each unit function for each component or the like, and an object is provided for each of these unit functions. Accordingly, object-oriented programming utilizes a way of thinking known as inter-object message communication to perform exchange of messages between objects for linking respective objects.

However, in an electronic control apparatus of this type, even when a control program thereof is devised with object orientation, no effective measures exist for causing exchange of messages among the respective objects (i.e., inter-object message communication). That is, the proposed apparatus still requires a large amount of storage area of RAM, because the values of a program counter and various registers must be stored in a stack area of RAM. In particular, the larger the number of nesting (i.e., combinations of calls composed of multiple hierarchical levels), the markedly greater the consumed storage area of RAM. Thus, effective use of memory resources are restricted.

SUMMARY OF THE INVENTION

It is an object of the present invention to provide an electronic control apparatus capable of performing object processing by dividing a control program into respective unit functions in real time without requiring a lot of memory resources, and being capable of easily realizing time waiting processing.

According to the present invention, a plurality of means for unit processing are provided to respectively perform processing, in accordance with an object of a program subdivided into each unit function for controlling a control target, to realize the respective unit functions. Here, the unit processing means are functional means realized by operation of a CPU of a microcomputer. Accordingly, any one of the plurality of unit processing means selectively performs a processing task, and together therewith, by the respective unit processing means issues a message as a processing request to other unit processing means which is an output designation of a message thereof to perform processing.

In one aspect, the message generated by each unit processing means is categorized into a first type message which does not contain the count value for indicating the delay time until the time when the destination unit processing means of the message starts the process operation, and a second type message which contains the count value.

The electronic control apparatus is provided with a first storage control means for storing a first type message generated from a unit processing means in a first message storage means and an activation control means. The activation control means reads out the first type message which has been first stored among first type messages stored in the first message storage means at the point in time when any one of a plurality of unit processing means has completed the process operation, activates the destination unit processing means of the read out first type message to start the process, and deletes the read out first type message from the first message storage means.

As a result, when any one of the unit processing means starts the process operation and sends out the first type message to another unit processing means during the process operation, the first type message is stored in the first message storage means by the first storage control means. When the process operation of the unit processing means which has generated the first type message is completed, from that point in time, the process of the destination unit processing means of the stored first type message is started. When an object in process operation generates a first type message to any one of the objects, the first type message is stored temporarily in the first message storage means, and when the process of the object which has generated the first type message is completed, the process of the destination object of the stored first type message is immediately performed.

Furthermore, when unit processing means successively generates first type messages to a plurality of unit processing means during process operation, the first type messages are successively stored in the first message storage means by the first-storage control means. When the process operation of the unit processing means which had generated the first type messages is completed, the process of destination unit processing means of the stored plurality of first type messages is performed in the storing order of the first type messages (output order).

In another aspect of the electronic control apparatus, when a unit processing means sends a timer message (second type message which contains the count value for indicating the delay time until the starting of the process operation) to the unit processing means itself or another unit processing means during the process operation, the timer message is stored in timer message storage means by timer message storage control means. The count value of the timer message stored in the timer message storage means is reduced by a predetermined value every time a predetermined event occurs. When the count value reaches a predetermined set value, the process of the unit processing means corresponding to the destination of the timer message is started.

As a result, the process of unit processing means corresponding to the destination of the timer message is performed after an elapse of a time corresponding to the count value contained in the timer message, the time waiting process, that is, the process of a specific object (process of a unit processing means) is started after an elapse of a predetermined time from a certain point in time, can be easily realized.

BRIEF DESCRIPTION OF THE DRAWINGS

The above and other objects, features and advantages of the present invention will become more apparent from the following detailed description made with reference to the accompanying drawings. In the-accompanying drawings:

FIG. 2 is a schematic diagram showing a relation between control targets stored in a ROM and a message delivery control unit;

FIG. 4 is a state transition diagram showing state transition of the message delivery unit;

FIGS. 10A to 10C are schematic diagrams showing the message delivery processes;

FIGS. 16A to 16C are schematic diagrams showing the timer message deletion process;

FIG. 17 is a timing diagram showing a data communication rule between the ECU and the tester;

DETAILED DESCRIPTION OF THE PREFERRED EMBODIMENT

An electronic control apparatus according to an embodiment of the present invention is described in detail hereinafter with reference to the drawings.

Figures 1, 3:
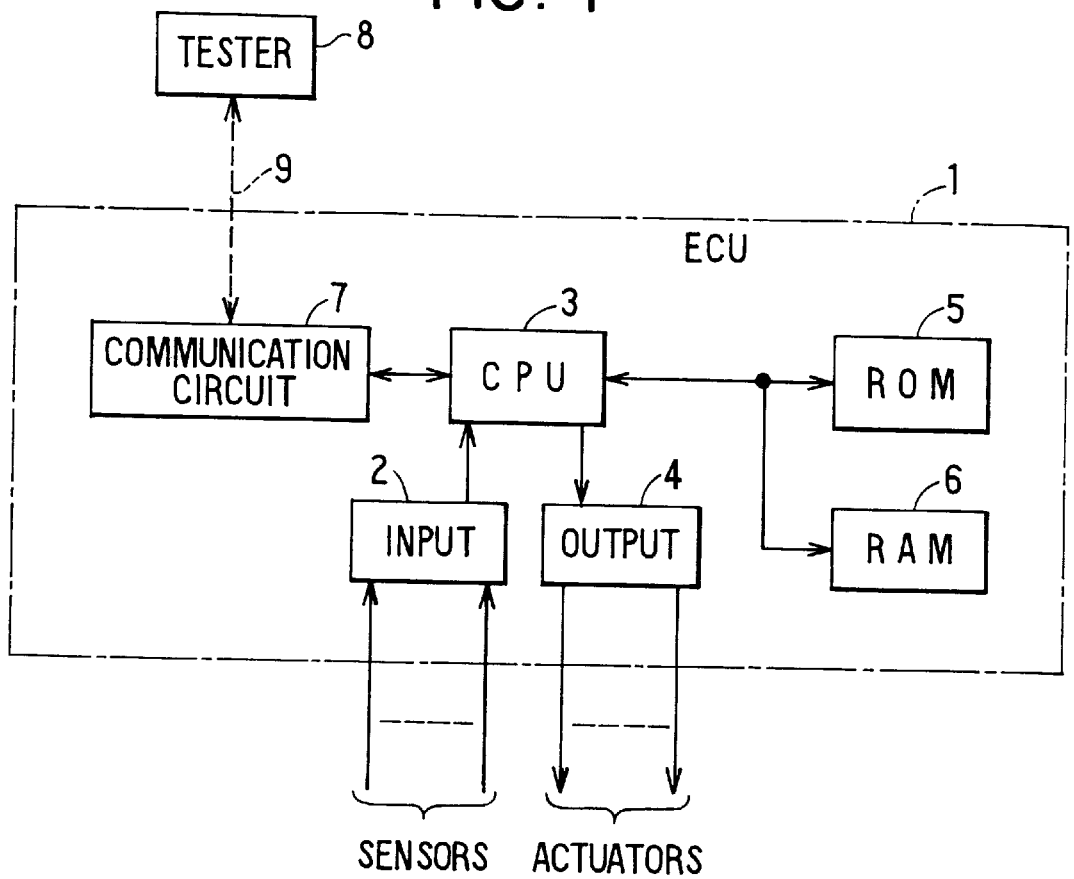
FIG. 1 is a block diagram showing an electronic control apparatus (ECU) according to an embodiment of the present invention.
FIG. 3 is a schematic diagram showing a connection information database.

First, FIG. 1 is a block diagram for illustrating the hardware structure of an electronic control apparatus (referred to as ECU hereinafter) 1 of the embodiment designed for controlling an internal combustion type engine mounted on. an automobile.

As shown in FIG. 1, ECU 1 is provided with an input circuit 2 for receiving signals generated from various sensors, for example, a rotation sensor for generating pulse signals generated every predetermined angular rotation (for example 30 degrees CA) of a crankshaft of an engine and a coolant temperature sensor for generating analog signals corresponding to the temperature of coolant water of the engine, a failure diagnosis communication circuit 7 connected to the ECU 1 through a communication line 9 for communicating the data with external units (referred to as tester hereinafter) 8, a CPU (central processing unit) 3 which calculates the optimal control quantity for the engine based on signals supplied from the input circuit and generates control signals based on the calculation result, and communicates the data for failure diagnosis with the tester 8 through the communication circuit 7 when the tester 8 is connected to the ECU 1, an output circuit 4 for receiving control signals from the CPU 3 to drive actuators such as a throttle valve of the engine and an injector (fuel injection valve), a nonvolatile ROM 5 for storing programs to be performed by the CPU 3 and the data to be referred to when the program is performed, and a volatile RAM 6 for temporarily storing calculation results of the CPU 3.

In the ECU 1, the CPU 3, ROMS, and RAM 6 are main components of a microcomputer, and the microcomputer is provided with an I/O port for supporting the CPU 3 to communicate signals between the input circuit 2 and the output circuit 4, and a serial communication interface comprising a reception register and transmission register for supporting the CPU 3 to communicate the data with the tester 8 through the communication circuit 7, though these components are not shown in the drawing. A part of memory area of the RAM 6 is set as a back-up RAM which is capable of retaining the stored content when the power supply to the ECU 1 is shut down.

In the ECU 1 of the present embodiment, the control program (in detail, communication control program with the tester 8 and engine control program) and data which are stored in the ROM 5 and performed by the CPU 3 are programmed according to the object oriented programming. The ECU 1 of the present embodiment is provided with a message delivery control unit 10 shown in FIG. 2 as means for realizing the communication between objects.

FIG. 2 is for illustrating the conceptual diagram showing the relation between control targets stored in the ROM 5 and the message delivery control unit 10. The message delivery control unit 10 is not a hardware but is a functional part which is realized by means of operation of the CPU 3 according to the message delivery control target stored in the ROM 5.

The message delivery control unit 10 is described addressing on the program for communicating the data with the tester 8.

First, as shown in FIG. 2, the ROM 5 contains a service object OB1 served for preparation of the data to be transmitted to the tester 8 as an object for controlling the data communication with the tester 8, a communication handler object OB2 for communicating signals with the tester 8, and a rotation sensor object OB3 for calculating the engine rotation speed based on the signal supplied from the rotation sensor. The rotation sensor object OB3 is served also as the object for controlling the engine.

The ROM 5 also contains objects OB4 to OBn in addition to the objects OB1 to OB3, objects for realizing the function of the message delivery control unit 10 (message delivery control target) and timer objects which. are activated every predetermined time are included among these objects.

In the ECU 1 of the present embodiment, the process sequence of the objects OB1 to OBn is determined according to the virtual inter-object message communication in which the objects OB1 to OBn transmit messages for asking the process to the object itself or other objects to activate the object which receives a message.

In the ECU 1 of the present embodiment, the message is categorized into the object message and the timer message. The former is the first type message which does not contain the count value for indicating the delay time until the object corresponding to the destination of the message starts the process operation (referred to as time counter hereinafter) and the latter is the second type message which contains the timer counter.

An object message contains an object identification number for indicating the destination object of the message (referred to as OID hereinafter) and a method identification number (referred to as MID hereinafter) for indicating the method to be executed among methods which are component of the destination object as the content, and a timer message contains the above-mentioned timer counter in addition to the OID and MID as the content. An object message and timer message can contain an argument additionally as the content. As a term including the object message and timer message, a term "message" is used hereinafter.

Next, the message delivery control unit 10 for realizing the inter-object message communication serves two functions. The former function is that an object message generated from an object is subjected to queuing, the object message that is queued first among above-mentioned queued object messages is read out every time when a predetermined delivery condition is held, and the read out object message is delivered to the destination object of the message. The latter function is that a timer message generated by an object is subject to queuing, the timer counter of the queued timer message is reduced by a predetermined value every time (reduced by 1 in the present embodiment). When the timer counter value reaches a predetermined set value (0 in the present embodiment) the timer message is delivered to the destination object of the message as an object message.

"Queuing" means the operation for performing insertion storage of a data in a queue, and "queue" means a waiting line in which data is inserted on one end of a data structure and a data is deleted on the other end. "Delivery" means the starting of process of a destination object of a message (in detail, execution of a method of an object specified by a message).

As shown in FIG. 2, the message delivery control unit 10 is provided with an object message storage unit 12 (equivalent to the first message storage means) for queuing object messages from each object, a timer message storage unit 13 (equivalent to the second message storage means) for queuing timer messages from each object, and a free memory block storage unit 14 for providing memory blocks to the object message storage unit 12 and timer message storage unit 13 for storing (queuing) the message.

Herein, the object message storage unit 12, the timer message storage unit 13, and the free memory block storage unit. 14 are included in the memory area of the RAM 6, and the capacity varies dynamically. The memory block corresponds to the unit capacity of storage units 12, 13 and 14, and equivalent to a capacity unit which is capable of storing 1 message.

In detail, first the predetermined number (for example, 10) of memory blocks has been secured previously in the RAM, and at the starting, all the memory blocks function as the free memory block storage unit 14. When an object message is generated from an object, 1 memory block which is a component of the free memory block storage unit 14 is reduced and 1 memory block which is a component of the object message storage unit 12 increases instead, and the object message is stored (queued) in the incremental memory block.

Similarly, when a timer message is generated from an object, 1 memory block which is a component of the free memory block storage unit 14 is reduced and 1 memory block which is a component of the timer message storage unit 13 is increased instead, and the timer message is stored in the incremental memory block.

On the other hand, when an object message is read out from the object message storage unit 12 and delivered to an object, the memory block where the object message is stored is returned from the object message storage unit 12 to the free memory block storage unit 14.

Furthermore, as described hereinafter, a timer message having the timer counter of 0 among timer messages queued in the timer message storage unit 13 is re-queued from the timer message storage unit 13 to the object message storage unit 12 as an object message, and the re-queued message is read out from the object message storage unit 12 and delivered to the corresponding object in the same way as in the case of an original object message generated from an object. When such timer message is re-queued, the memory block where the timer message has been stored is transferred to the object message storage unit 12.

Accordingly, to describe the mechanism conceptually, all the memory blocks secured in the RAM 6 are contained first in the free memory block storage unit 14. When an object message or a timer message is generated from an object, 1 memory block is delivered (relegated) to the object message storage unit 12 or the timer message storage unit 13 and the message is stored in the delivered memory block. When an object message queued in the object message storage unit 12 is delivered to the destination object, the memory block where the object message has been stored is returned from the object message storage unit 12 to the free memory block storage unit 14 for re-using.

A memory block where an object message is stored is referred to as an object message block, a memory block where a timer message block is stored is referred to as a timer message block, and a memory block where no effective message is stored is referred to as a free memory block hereinafter. As a term including the object message block, timer message block, and free memory block, a term "Memory block" is used hereinafter.

On the other hand, furthermore, the message delivery unit is provided with a connection information data base 16 to specify the destination of an object message read out from the object message storage unit 12, that is, to specify the address in the ROM 5 where the method of the object which OID and MID contained in the read out message indicates is stored.

The connection information data base 16 comprises a stored data table which correlates combinations of OID and MID with head addresses (that is, execution starting address) in the ROM 5 where respective methods indicated by means of combinations are stored as shown in FIG. 3. For example, in the data table shown in FIG. 3, the method of the object having OID of n and MID of m is stored in the ROM 5 as the address having the head of "Anm". The connection information data base 16 comprising the data table as described above is stored previously in the ROM 5 together with objects.

Next, the state transition and function of the message delivery unit 10 are described with reference to FIG. 4. Herein, FIG. 4 is a state transition diagram of the message delivery control unit 10. The process performed by the message delivery control unit 10 described hereinunder is actually realized by operation of the CPU 3 according to the method of a message delivery control target stored in the ROM 5.

The message delivery control unit 10 is in turned off as shown by (a) in FIG. 4 while an ignition switch of a vehicle has been turned off and the microcomputer of the ECU 1 is not in operation. When, for example, an ignition switch is turned from off to on or the microcomputer is reset, and initialization is requested, the initialization process is performed as shown by (b) in FIG. 4, and then the message delivery control unit is brought into a state of message waiting as shown by (c) in FIG. 4.

Figure 5:
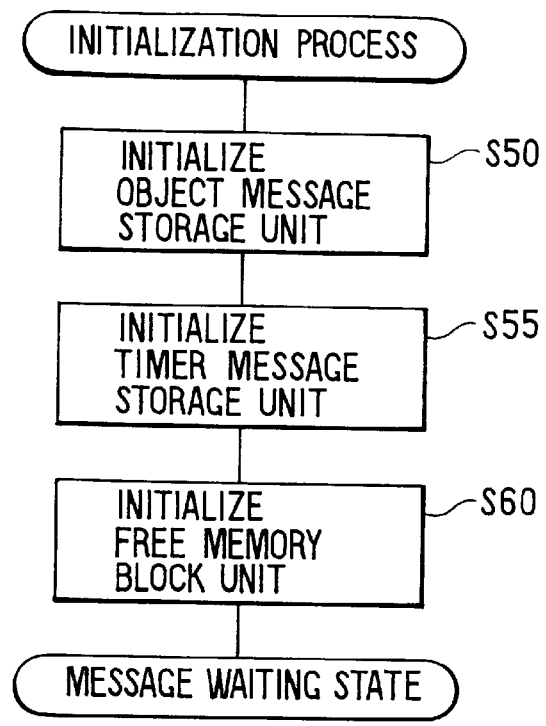
FIG. 5 is a flow diagram showing an initialization process of the message delivery unit.

In the initialization process shown by (b) in FIG. 4, as shown in FIG. 5, first the object message storage unit 12 and the timer message storage unit 13 are initialized in S50 and S55. In detail, free memory blocks held by the object message storage unit 12 and the timer message storage unit 13 are delivered to the free memory block storage unit 14. Next, the free memory block storage unit 14 is initialized in S60. In detail, when a message is generated from an object, the free memory blocks held by the free memory block storage unit 14 become ready to be delivered to the object message storage unit 12 and the timer message storage unit 13.

After completion of such initialization processes, the message delivery control unit 10 is brought into the state of message waiting.

The state of message waiting is a state in which an object generated from an object is ready to be queued in the object message storage unit 12 or the timer message storage unit 13. When an ending is requested, for example, an ignition switch is turned off in this state, the message delivery control unit 10 performs serialization process as shown by (d) in FIG. 4, and then returns to the off state as described above.

Figure 6:
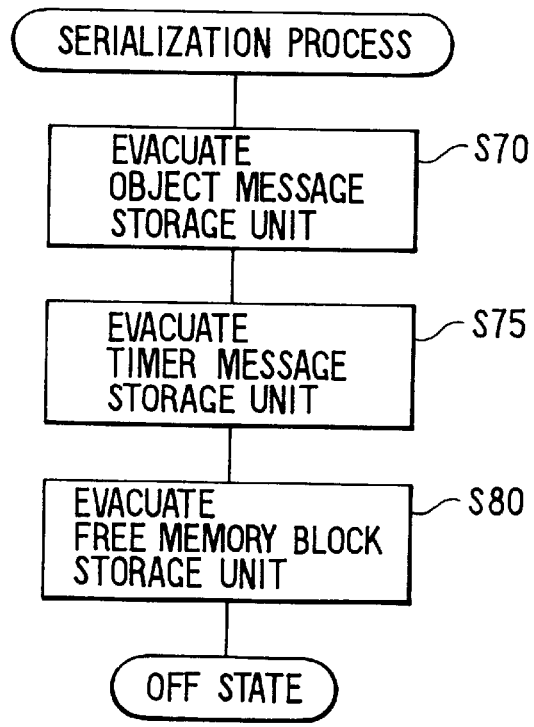
FIG. 6 is a flow diagram showing serialization process of the message delivery unit.

In the serialization process shown by (d) in FIG. 4, as shown in FIG. 6, the data stored in the object message storage unit 12 and the timer message storage unit 13 are evacuated to the backup RAM in S70 and S75 respectively, and next the data stored in the free memory block storage unit 14 is evacuated to the backup RAM in S80. After completion of the serialization process as described above, the message delivery control unit is brought into off state.

On the other hand, when an object message is generated from an object in state of message waiting, the message delivery control unit 10 performs message queuing process as shown by (e) in FIG. 4 so as to queue the object message from the object in the object message storage unit 12, and returns to the state of message waiting.

In the present invention, an object message is generated in response to generation of a message transmission request by the object. In the description hereinafter, the object message having OID of n (=1, 2, . . . ) and MID of m (=1, 2, . . . ) as the message content is referred to as "Object message (n, m)" particularly, and the message transmission request for generation of the object message (n, m) is referred to as "Message transmission request (n, m)".

Figure 7:
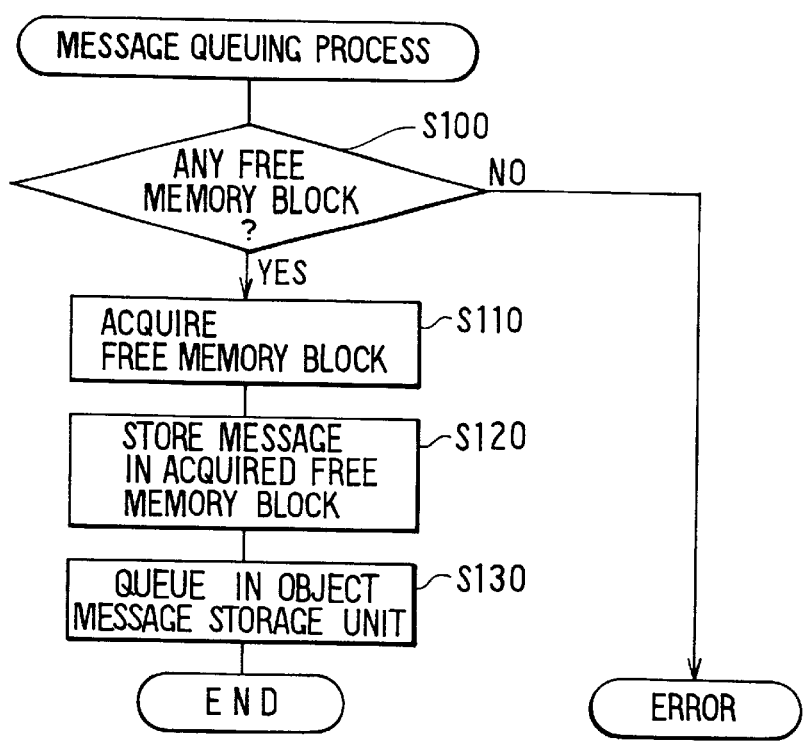
FIG. 7 is a flow diagram showing message queuing process of the message delivery unit.

In the message queuing process performed when an object generates an object message (message transmission request), as shown in FIG. 7, first whether a free memory block can be acquired from the free memory block storage unit 14 (that is, whether there is any free memory block in the free memory block storage unit 14) is checked in S100. If a free memory block can be acquired, then the free memory block located at the head among memory blocks, that is, the free memory block that is queued first among free memory blocks queued in the free memory block storage unit 14, is acquired.

The object message generated now from the object is stored in the free memory block acquired as described above in S120. In detail, the content of the object message that is, OID and MID or OID, MID, and additional argument is stored in the free memory block.

In the subsequent S130, the memory block in which the object message has been stored in S120 is queued in the object message storage unit 12. In other words, the memory-block in which the object message has been stored is registered in the tail of the object message block in the object message storage unit 12 as an object message block. After the process in S130, the message queuing process is brought to an end.

If a free memory block cannot be acquired in S100 (that is, there is no free memory block in the free memory block storage unit 14), then an error message is sent to the method of the object which has generated the message transmission request, and a fail-safe process is performed thereby.

Figure 8B:
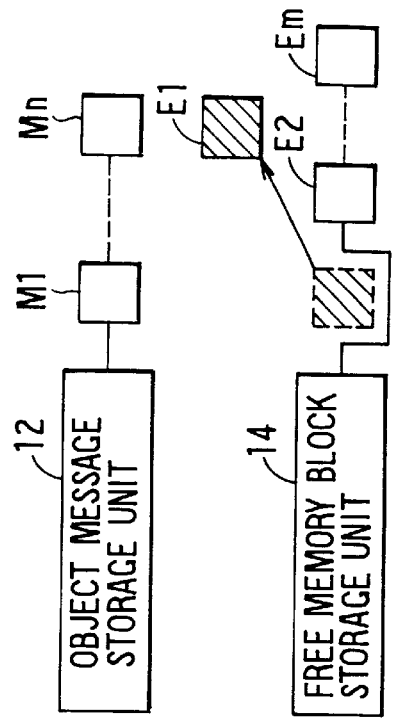
FIGS. 8A to 8D are schematic diagrams showing message queuing processes.
Figure 8D:
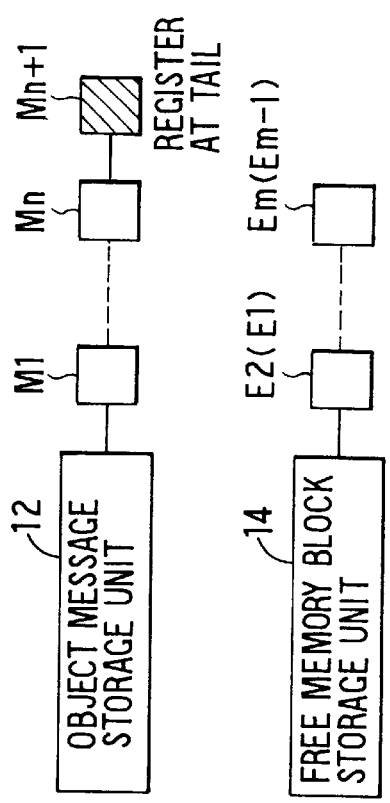
Figure 8A:
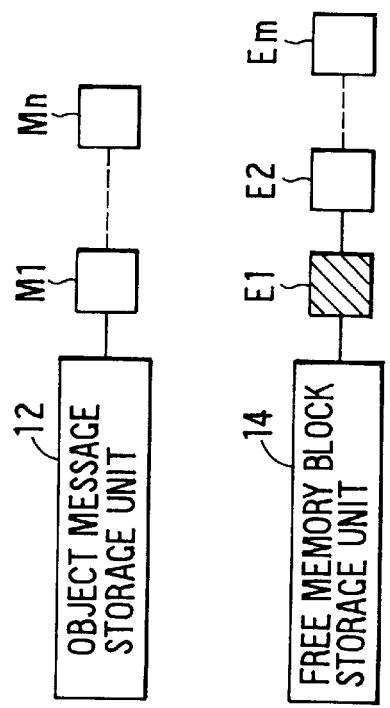

When the message queuing process is performed, the head free memory block E1 is selected from among free memory blocks E1 to Em in the free memory block storage unit 14 as shown in FIG. 8A with shading and the free memory block E1 is acquired as shown in FIG. 8B (S100: YES, S110).

Figure 8C:
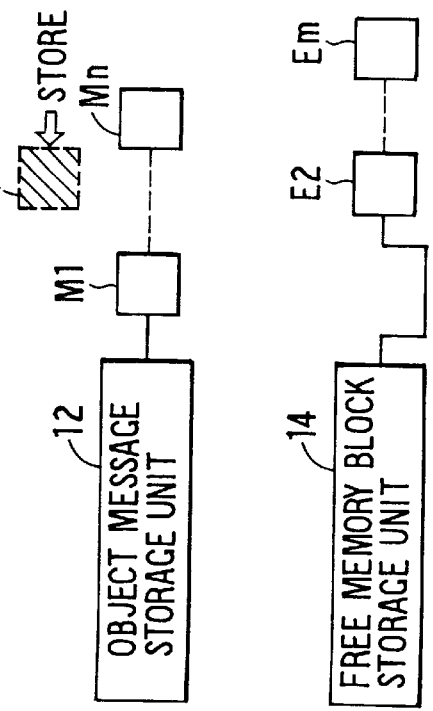

The content of the object message generated now from the object is stored in the acquired free memory block E1 (S120) as shown in FIG. 8C, and finally the memory block E1 in which the content of the object message is stored is registered after the object message blocks M1 to Mn in the object message storage unit 12 as the object message block Mn+1 (S130) as shown in FIG. 8D, and the queuing of the object message in the object message storage unit 12 is brought to an end.

In this state, the object message block M in the object message storage unit 12 increases by 1, and instead the free memory block E in the free memory block storage unit 14 decreases by 1 as shown in FIG. 8D. As shown in FIG. 8D in bracket, the second head free memory block E2 in the free memory block storage unit 14 becomes the head free memory block E1, and the free memory block Em located at the m-th position initially becomes the (m-1)-th free memory block Em-1.

On the other hand, next the message delivery control unit is brought into the state of message delivery as shown by (g) in FIG. 4 when the object generates a message delivery request as shown by (f) in FIG. 4 in the state of message reception waiting.

In the state of message delivery, as shown by (h) in FIG. 4, if there is an object message queued in the object message storage unit 12, then message delivery process described hereinafter is performed. The queued object message is delivered (that is, execution of the method of the object specified by means of the object message). On the other hand, if there is no queued object message in the object message storage unit 12 as shown by (i) in FIG. 4, then the sequence returns to the state of message reception.

In the state of message delivery, when the object in execution generates a message transmission request (object message), the message queuing process shown in FIG. 7 is performed as shown by (j) in FIG. 4 in the same manner as performed in the state of message reception waiting.

Figure 9:
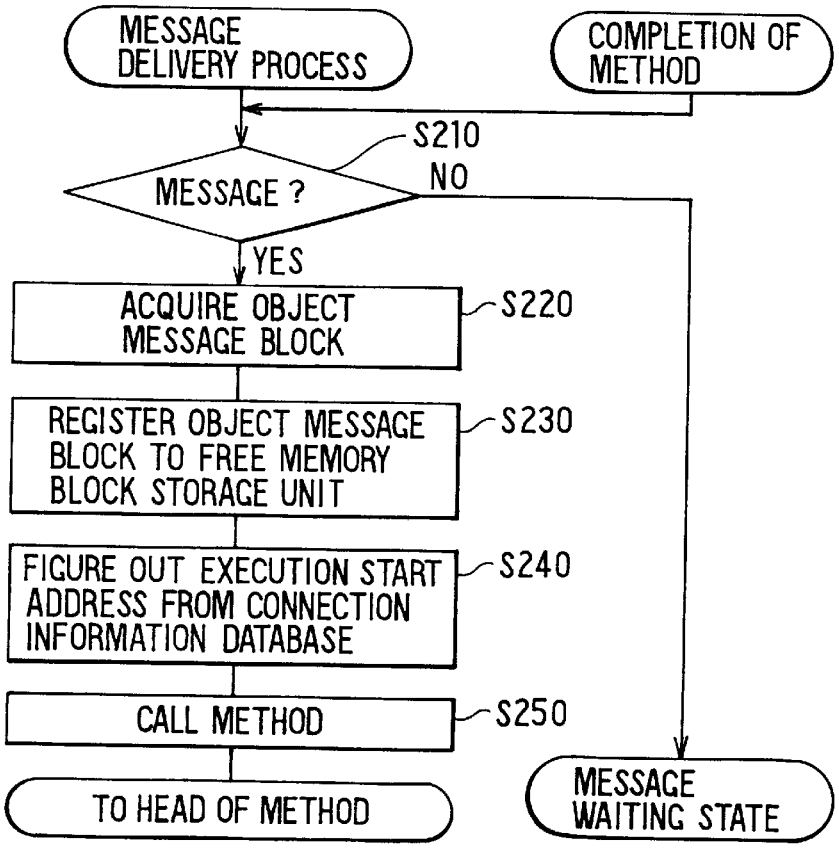
FIG. 9 is a flow diagram showing the message delivery. processes of the message delivery unit.

As shown in FIG. 9, the message delivery process is performed when an object generates a message delivery request or when execution of the method of an object is completed, first in S210, whether there is any queued object message in the object message storage unit 12 (that is, an object message block can be acquired from the object message storage unit 12) is checked. If there is a queued object message, then the head object message block among the object message blocks, that is, the object message block queued first out of object message blocks queued in the object message storage unit 12, is acquired, and the message content (OID and MID) stored in the object message block is read out.

Next, in S230, the object message block acquired in the S220 is registered at the tail of free memory blocks in the free memory block storage unit 14 as a free memory block.

In the subsequent S240, the head address (execution starting address) of the ROM 5 in which the method of the object corresponding to OID and MID that is, the message content read out in the S220 is figured out by means of retrieval from the connection information database 16, and the execution starting address figured out in the S240 is called in the subsequent S250.

Then, the execution target of the program performed by the CPU 3 is transferred to the head of the method of the object corresponding to the message content read out in S220, and the object message is delivered thereby. After the completion of the process execution of the method, the message delivery process is performed again from the S210.

If it is found that there is no queued object message in the object message storage unit 12 in the S210 (that is, an object message block cannot be acquired from the object message storage unit 12), then the sequence returns to the state of message reception waiting as it is.

Accordingly, when the message delivery process is performed, the head object message block M1 is selected from among object message blocks M1 to Mn in the object message storage unit 12 as shown in FIG. 10A. As shown in FIG. 10B, the object message block M1 is acquired, and the message content stored in the object message block M1 is read out (S210: YES, S220).

Furthermore, as shown in FIG. 10C, the object message block M1 is registered (S230) at the tail of free memory blocks E1 to Em in the free memory block storage unit 14 as the free memory block Em+1 after the message content has been read out, and the execution of the method of the object corresponding to the message content read out from the object message block M1 is started.

Furthermore, in this state, as shown in FIG. 10C, the free memory block E in the free memory block storage unit 14 increases by 1, and instead the object message block M in the object message storage unit 12 decreases by 1. As shown in FIG. 10C in bracket, the object message block M2 located at the second head position in the object message storage unit 12 becomes the head object message block M1, and the object message block Mn located initially at the n-th position becomes the (n-1)-th object message block Mn-1.

On the other hand, furthermore the message delivery control unit 10 performs timer message queuing process as shown by (k) in FIG. 4 when an object generates a timer message in the state of message reception waiting to queue the timer message generated from the object in the timer message storage unit 13, and then returns to the state of message reception waiting. The message delivery control unit 10 performs timer message queuing process as shown by (l) in FIG. 4 when an object in execution generates a timer message in the state of message delivery as in the case of the state of message reception waiting, and queues the timer message generated from the object in the timer message storage unit 13.

In the present embodiment, an object generates a timer message transmission request to cause generation of a timer message. In the description presented hereinafter, the timer massage having the message content of OID of n (=1, 2, ...) and MID of m (=1, 2, ...) and having the timer counter of P (=P1, P2, ..., wherein P1, P2, ... are integers) is referred to as "timer message (n, m, P)" particularly, and the timer message transmission request for generation of the timer message (n, m, P) is referred to as "timer message transmission request (n, m, P)".

Figure 11:
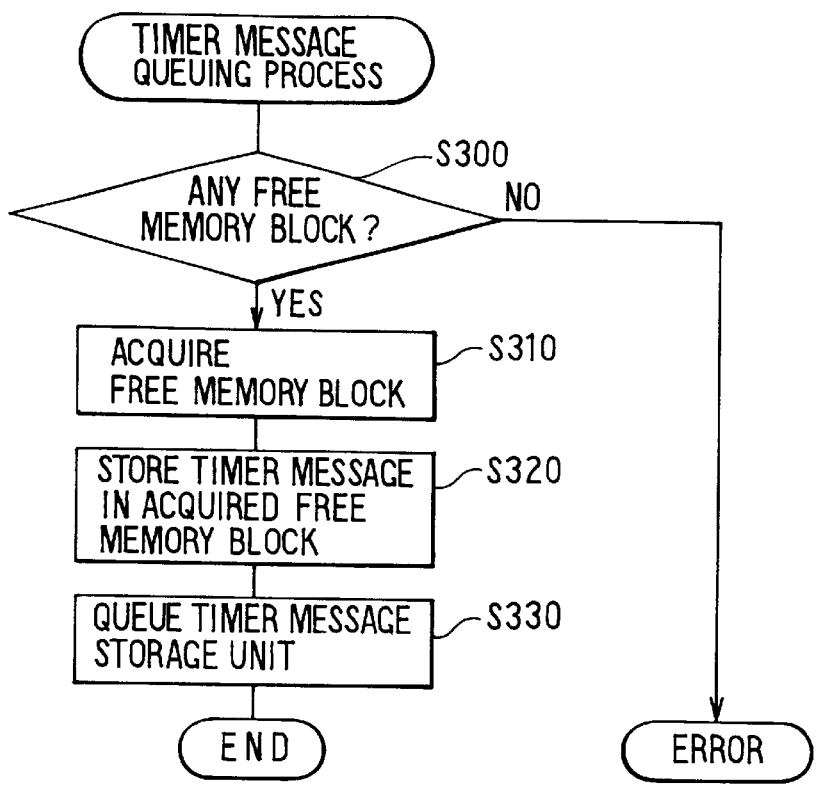
FIG. 11 is a flow diagram showing a timer message queuing process of the message delivery unit.

In the timer message queuing process performed when an object generates a timer message (timer message transmission request), as shown in FIG. 11, whether a free memory block can be acquired from the free memory block storage unit 14 (that is, whether there is a free memory block in the free memory block storage unit 14) is checked in S300. If a free memory block can be acquired, then the head free memory block among free memory blocks is acquired in the subsequent S300.

Next in S320, the timer message generated from the object now is stored in the acquired free memory block. In detail, the content of the timer message that is, OID, MID, and timer counter, or additional argument are stored in the free memory block.

In the subsequent S330, the memory block in which the timer message is stored in the S320 is queued in the timer message storage unit 13. In other words, the memory block in which the timer message is stored is registered at the tail of the timer message block as a timer message block in the timer message storage unit 13. After the processing in S330, the timer message queuing process is brought to an end.

If it is found that a free memory block cannot be acquired, then an error message is sent to the method of the object which generates the timer message transmission request, and a predetermined fail-safe process is thereby performed.

Figure 12B:
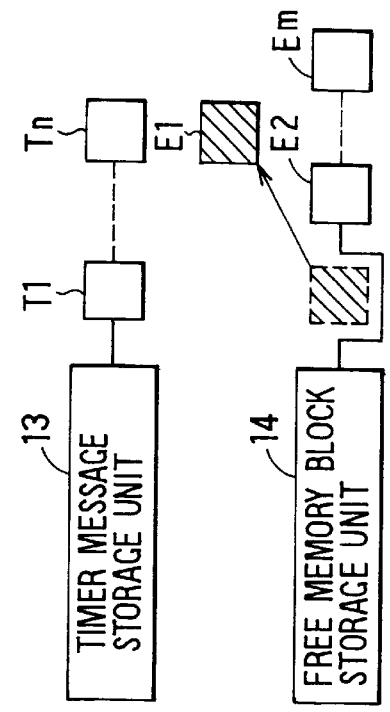
FIGS. 12A to 12D are schematic diagrams showing timer message queuing processes.
Figure 12D:
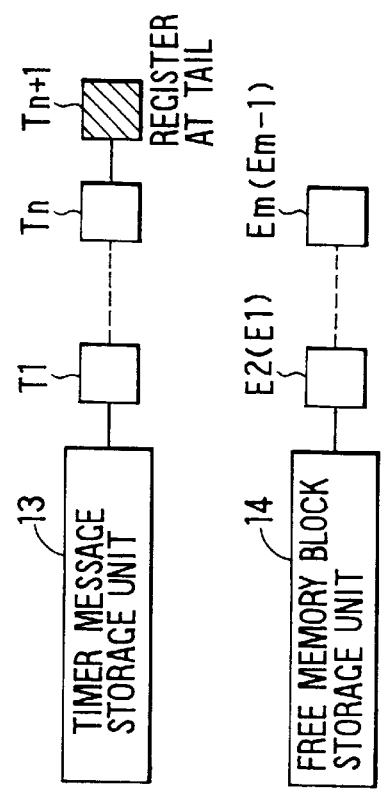
Figure 12A:
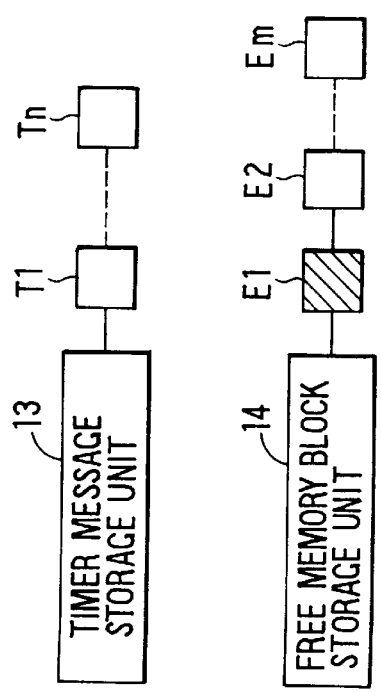

Accordingly, when the timer message queuing process is performed, the head free memory block E1 is selected from among free memory blocks E1 to Em in the free memory block storage unit 14 as shown in FIG. 12A with shading, and the free memory block E1 is acquired as shown in FIG. 12B (S300: YES, S310).

Figure 12C:
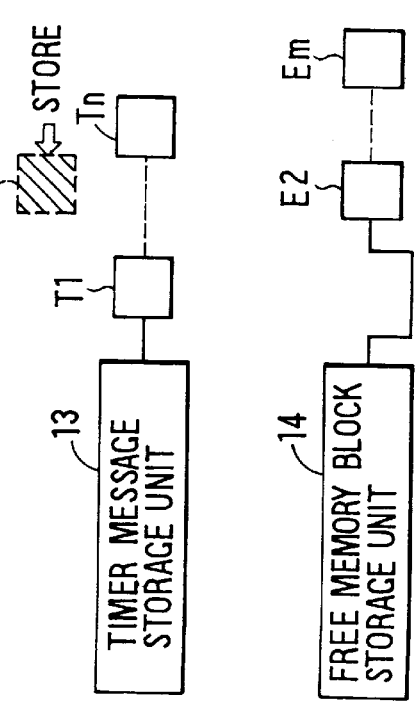

As shown in FIG. 12C, the content of the timer message generated this time from the object is stored in the acquired free memory block E1 (S320), and finally as shown in FIG. 12D, the memory block E1 in which the content of the timer message is stored is registered at the tail of timer message blocks T1 to Tn in the timer message storage unit 13 as the timer message block Tn+1 (S330), and the timer message queuing process in the timer message storage unit 13 is brought to an end.

In this state, as shown in FIG. 12D, the timer message block T increases by 1 in the timer message storage unit 13, and instead the free memory block E in the free memory block storage unit 14 decreases by 1. As shown in FIG. 12D in bracket, the free memory block E2 initially located at the second position in the free memory block storage unit 14 is shifted to the head free memory block E1, and the free memory block Em initially located at m-th position is shifted to the (m−1)-th free memory block Em−1.

On the other hand, the message delivery control unit 10 performs timer clock process as shown by (m) in FIG. 4 when the message delivery control unit 10 receives a timer clock request in the state of message reception waiting, and then returns to the state of message reception waiting. Furthermore the message delivery control unit 10 performs timer clock process as shown by (n) in FIG. 4 when the message delivery control unit 10 receives a time clock request also in the state of message delivery.

In the present embodiment, the timer clock request is generated as a notice for indicating the generation of an event of a passage of a predetermined time t from a timer object which is activated every predetermined time t (for example, 1 ms) as interruption process. The timer clock request generated as the event may be, for example, the rising edge or falling edge of a clock signal supplied from the external to the CPU 3.

Figure 13:
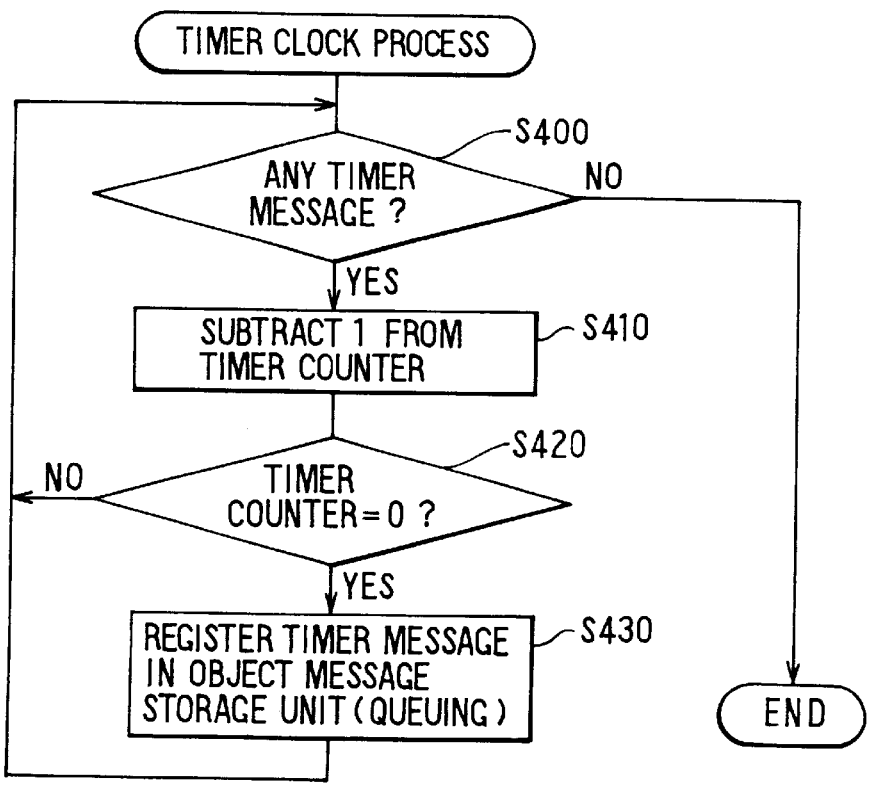
FIG. 13 is a flow diagram showing a timer clock process of the message delivery unit.

In the timer clock process performed correspondingly to the timer clock request every predetermined time t, whether there is any timer message to be processed in the timer message storage unit 13 is checked in S400 as shown in FIG. 13.

In S400, in the case that there is no timer message block which constitutes the timer message storage unit 13 (that is, in the case that there is no queued timer message in the timer message storage unit 13) or in the case that, though there is some timer message blocks which constitute the timer message storage unit 13, all the timer message blocks have been subjected already to the S410 and S420 processes described hereinafter, the timer message storage unit 13 is determined to have no timer message to be processed.

If it is found that there is no timer message to be processed in the timer message storage unit 13 in the S400, then the timer clock process is brought to an end, on the other hand if it is found that there is a timer message to be processed in the timer message storage unit 13 in the S400, then the sequence proceeds to S410, one of timer message blocks which constitute the timer message storage unit 13 is set as the processing target in this process, and the timer counter of the timer message which is stored in the process target timer message block is subtracted by 1. In S410, the timer message block in the timer message storage unit 13 is set as the processing target from the head successively every time when the S410 process is performed in one time clock process.

Next in S420, whether the timer counter reaches 0 after subtraction by 1 in the S410 is checked, and if it is found that the timer counter has reached 0, then the sequence proceeds to S430, the timer message stored in the processing target timer message block (that is, the timer message with the timer counter which has reached 0 by means of subtraction by 1 in S410) is re-queued in the object message storage unit 12 as an object message.

In detail, the processing target timer message block is transferred from the timer message storage unit 13 to the object message storage unit 12, at that time, the processing target timer message block is registered at the tail of the object message block in the object message storage unit 12. In this case, because the timer counter is not referred in the message delivery process shown in FIG. 9, the timer message block can be transferred to the object message storage unit 12 as an object message block as it is. A unnecessary timer counter of 0 may be deleted from the timer message block to be transferred to the object message storage unit 12.

After the S420 process is performed, or if it is found that the timer counter after subtraction by 1 does not reach 0 in the S420, the sequence returns to S400.

Accordingly, when the timer clock process is performed, timer message blocks queued in the timer message storage unit 13 are set successively from the timer message block queued first and the timer counter of the timer message stored in each timer message block is subtracted by 1 (S410), as a result the respective timer counters of timer messages queued in the timer message storage unit 13 are subtracted one by one every predetermined time t when the timer clock process is performed.

Figure 14A:
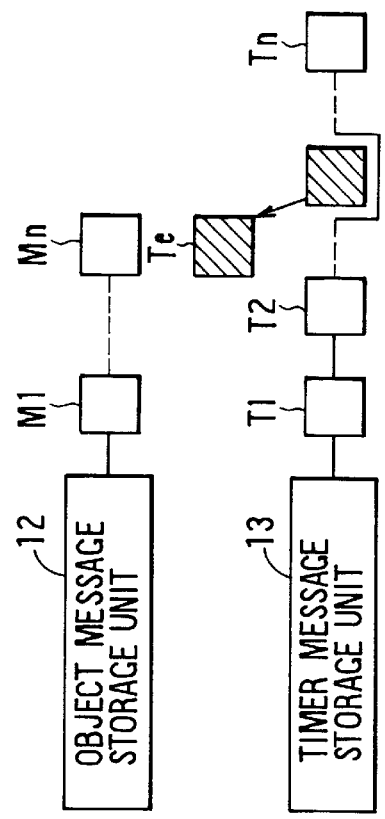
FIGS. 14A to 14C are schematic diagrams showing the timer clock processes.
Figure 14B:
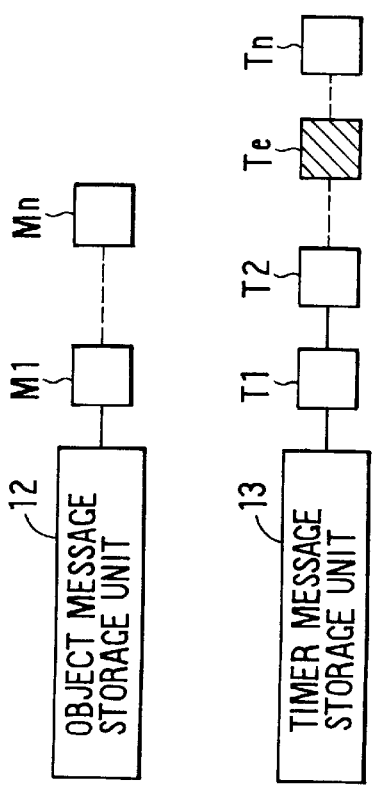
Figure 14C:
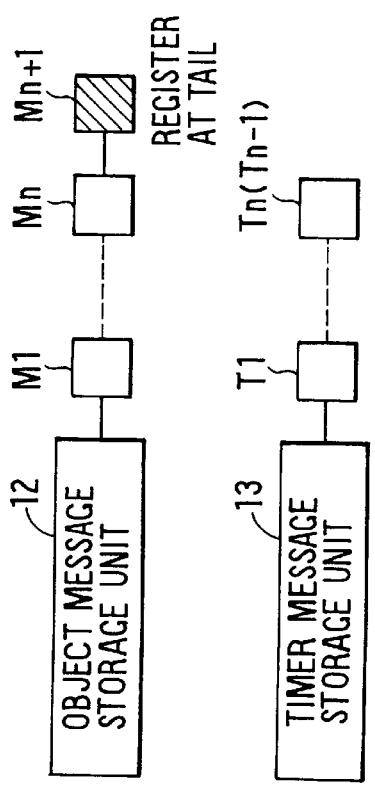

During the process described above, for example, as shown in FIG. 14A with shading, when the timer counter of the timer message stored in the timer message block Te located at the e-th position from the head among timer message blocks T1 to Tn is brought to 0 by subtraction by 1, the timer message block Te is taken out from the timer message storage unit 13 and registered at the tail of object message blocks M1 to Mn in the object message storage unit 12 as the object message block Mn+1 as shown in FIG. 14B and FIG. 14C (S420: YES, S430). In this state, as shown in FIG. 14C, the object message block M increases by 1 in the object message storage unit 12, and instead the timer message block T decreases by 1 in the timer message storage unit 13.

As a result, the respective timer counters of timer messages queued in the timer message storage unit 13 are subtracted by 1 every predetermined time t, and the timer message with the timer counter which has reached 0 is re-queued (stored) from the timer message storage unit 13 to the object. message storage unit 12.

The timer message re-queued as an object message is delivered by means of message delivery process shown in the FIG. 9 quite like an original object message generated from an object, and the method of the object specified by OID and MID of the message is executed.

When a timer message (x, y, Pz) is generated from an object and the timer message (x, y, Pz) is queued in the timer message storage unit 13 by means of timer message queuing process shown in FIG. 11, after the time (=t×Pz) equivalent to the timer counter Pz of the timer message (x, y, Pz) elapses, the method y of the object x specified by OID and MID of the timer message (x, y, Pz) is executed.

On the other hand, when an object generates a timer message deletion request as a deleting request in the state of message reception waiting, the message delivery control unit 10 performs the timer message deletion process as shown by (o) in FIG. 4 to delete the timer message corresponding to the timer message deletion request from the timer message storage unit 13, and then returns to the state of message reception waiting. Furthermore, also when the object in execution generates a timer message deletion request in the state of message delivery, the message delivery control unit 10 performs timer message deletion process as shown by (p) in FIG. 4 as in the state of message reception waiting to delete the timer message corresponding to the timer message deletion request from the timer message storage unit 13.

A timer message deletion request generated by an object contains OID and MID for specifying a timer message to be deleted. In the description described hereinafter, a timer message deletion request for deleting the timer message (n, m, P) having OID of n (=1, 2, . . . ) and MID of m (=1, 2, . . . ) as the message content is referred to as "timer message deletion request (n, m)".

Figure 15:
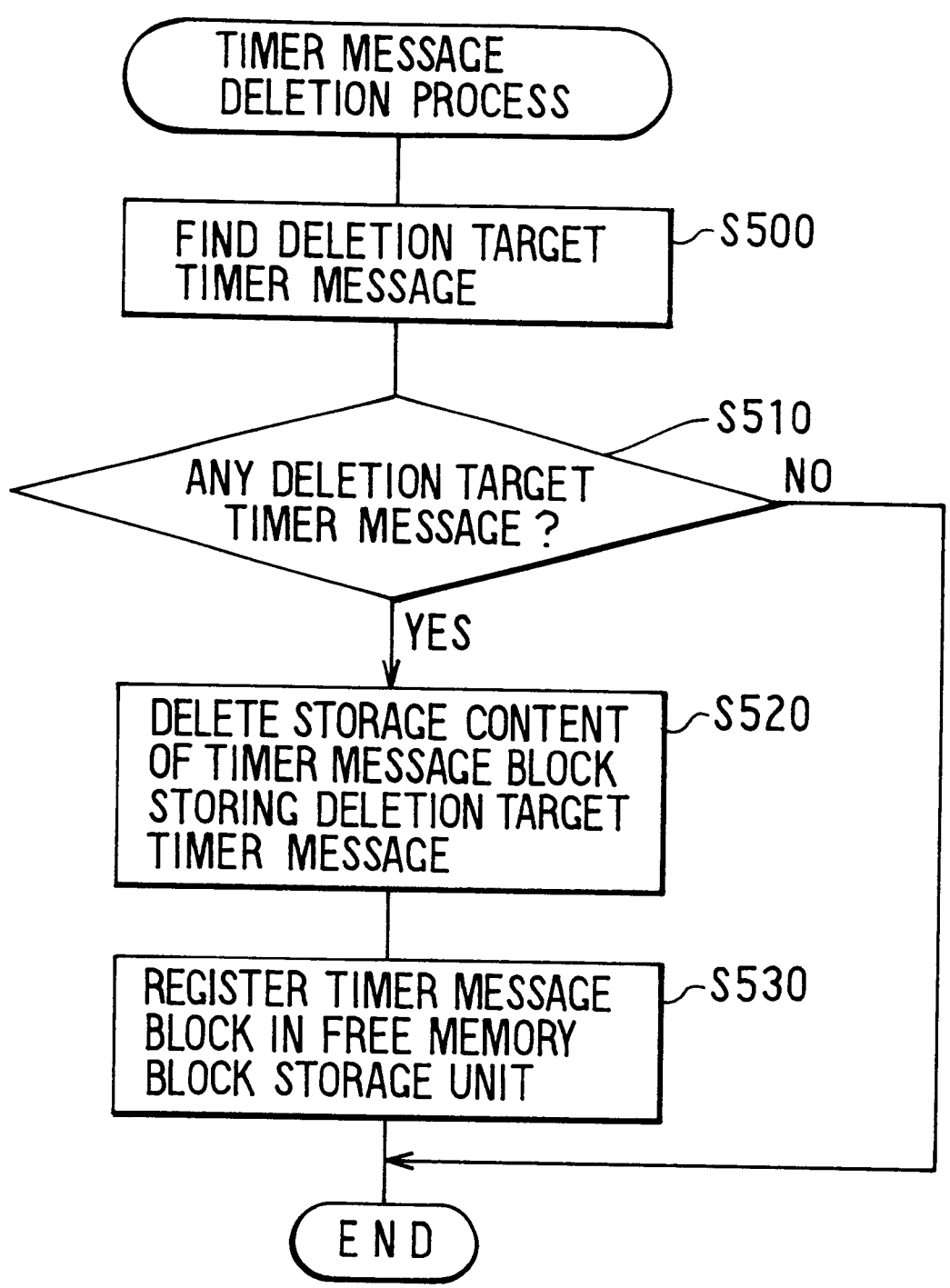
FIG. 15 is a flow diagram showing a timer message deletion process of the message delivery unit.

In the timer message deletion process performed when an object generates a timer message deletion request, as shown in FIG. 15, first in S500, the deleting target timer message which is coincident with OID and MID of the timer message deletion request generated from the object is found out in the timer message storage unit 13.

Next in S510, whether there is a deleting target timer message in the timer message storage unit 13 is checked, and if it is found that there is no deleting target timer message, then the timer message deletion process is brought to an end, on the other hand if it is found that there is a deleting target timer message, then the sequence proceeds to S520, the stored content of the timer message block which contains the deleting target timer message among timer message blocks in the timer message storage unit 13 is deleted.

In the subsequent S530, the timer message block from which the stored content has been deleted in the S520 is registered at the tail of free memory blocks in the free memory block storage unit 14, and then the timer message deletion process is brought to an end.

As a result, for example, as shown in FIG. 16A with shading, in the case that the timer message (x, y, Pz) is stored in the timer message block Tg located at the g-th position from the head among timer message blocks T1 to Tn in the timer message storage unit 13, when any one of objects generates a timer message deletion request (x, y), the stored content of the timer message block Tg located at the g-th position from the head is deleted by means of S500 to 520 processes.

As shown in FIG. 16B and FIG. 16C, the timer message block Tg from which the stored content has been deleted is taken out from the timer message storage unit 13 and registered at the tail of free memory blocks E1 to Em in the free memory block storage unit 14 as the free memory block Em+1 by means of S530 process. In this state, as shown in FIG. 16C, the free memory block E in the free memory block storage unit 14 increases by 1, and instead the timer message block T in the timer message storage unit 13 decreases by 1.

As a result, when a timer message deletion request (x, y) is generated from any one of objects, the timer message (x, y, Pz) corresponding to the timer message deletion request (x, y) is deleted from the timer message storage unit 13 as described above, therefore even though the time (=t×Pz) equivalent to the timer counter Pz of the timer message (x, y, Pz) elapses after the timer message (x, y, Pz) has been generated from any one of objects, the method y of the object x specified by OID. and MID of the timer message (x, y, Pz) is not executed.

To describe more clearly the message delivery control unit 10, the detail of message communication of objects OB1 to OB3 between these objects shown in FIG. 2 and the detail of control of the data communication between the ECU 1 and the tester 8 are described with reference to FIG. 17 to FIG. 28.

First, a rule shown in FIG. 17 is framed for communication between the ECU 1 and the tester 8.

In detail, first the tester 8 transmits a request message to ECU 1 as a data request. The ECU 1 transmits the response data containing the information corresponding to the received request message (rotation speed of an engine, temperature of engine coolant water, or the like) as the response message a predetermined amount at a time (1 byte by 1 byte in the present embodiment) to the tester 8 after the time t2 has elapsed from reception of the request message from the tester 8, at that time the ECU 1 transmits successively response message byte of the same type with an interval of time t1 or longer. FIG. 17 shows a case in which the total data amount of the response message is 2 bytes.

The tester 8 transmits the next request message to the ECU 1 after the time t3 or longer has elapsed from reception of all the response data bytes from the ECU 1. Furthermore, the tester 8 transmits a request message again if a response message is not returned from the ECU 1 within the time t3 from the transmission of the request message to the ECU1.

It is defined that the time t2 is longer than the time t1, and the time t3 is very longer than the time t1 and time t2. P1, P2, and P3 described in bracket in FIG. 17 are integers (P1=t1/t, P2=t2/t, P3=t3/t) obtained by dividing the times t1, t2, and t3 by the generation period t (that is, the period of the timer clock process shown in FIG. 13 performed by the message delivery control unit 10) of the timer clock request.

Figure 18:
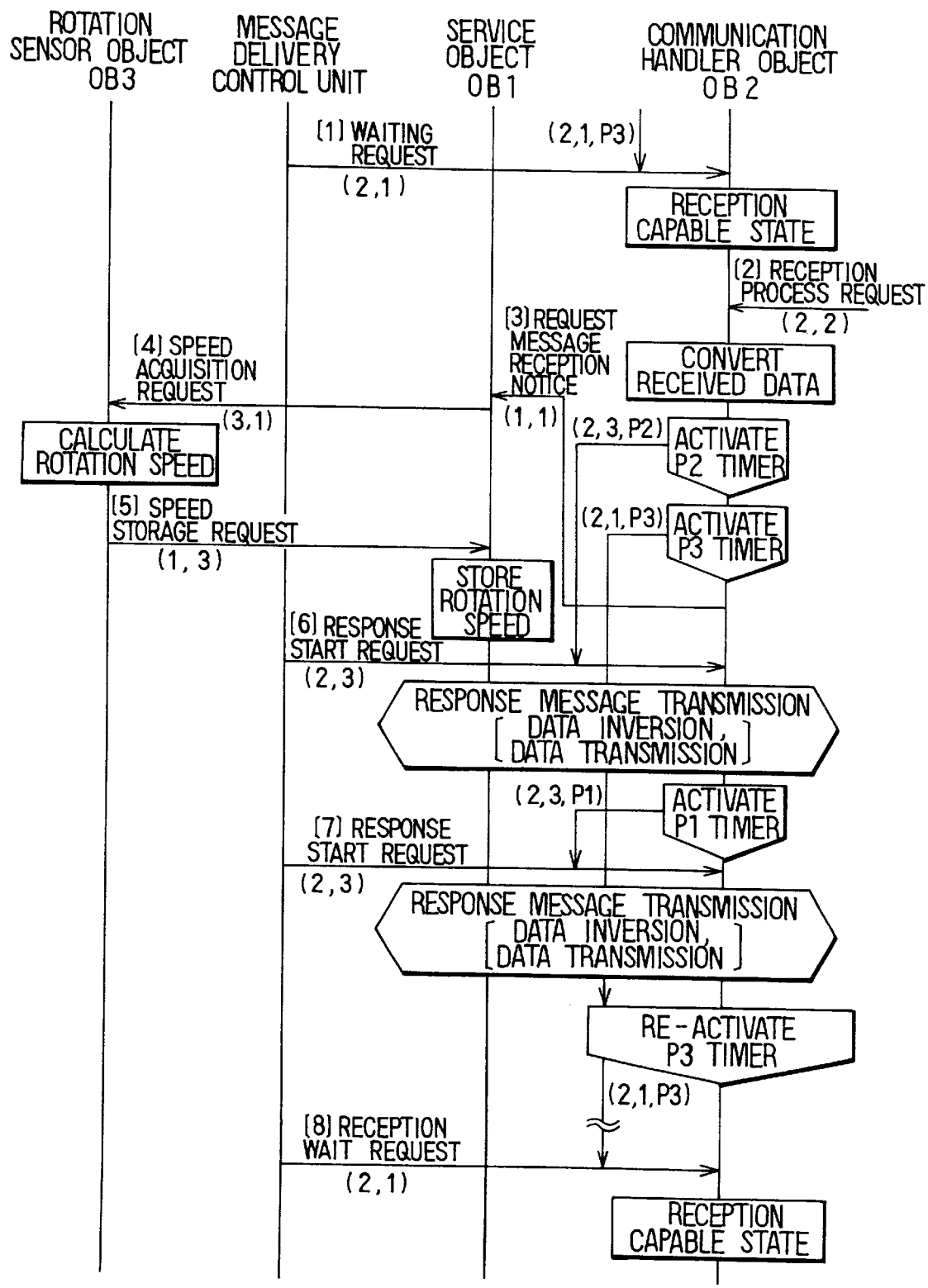
FIG. 18 is a message sequence diagram showing the process outline of objects for controlling data communication with the tester.
Figure 19:
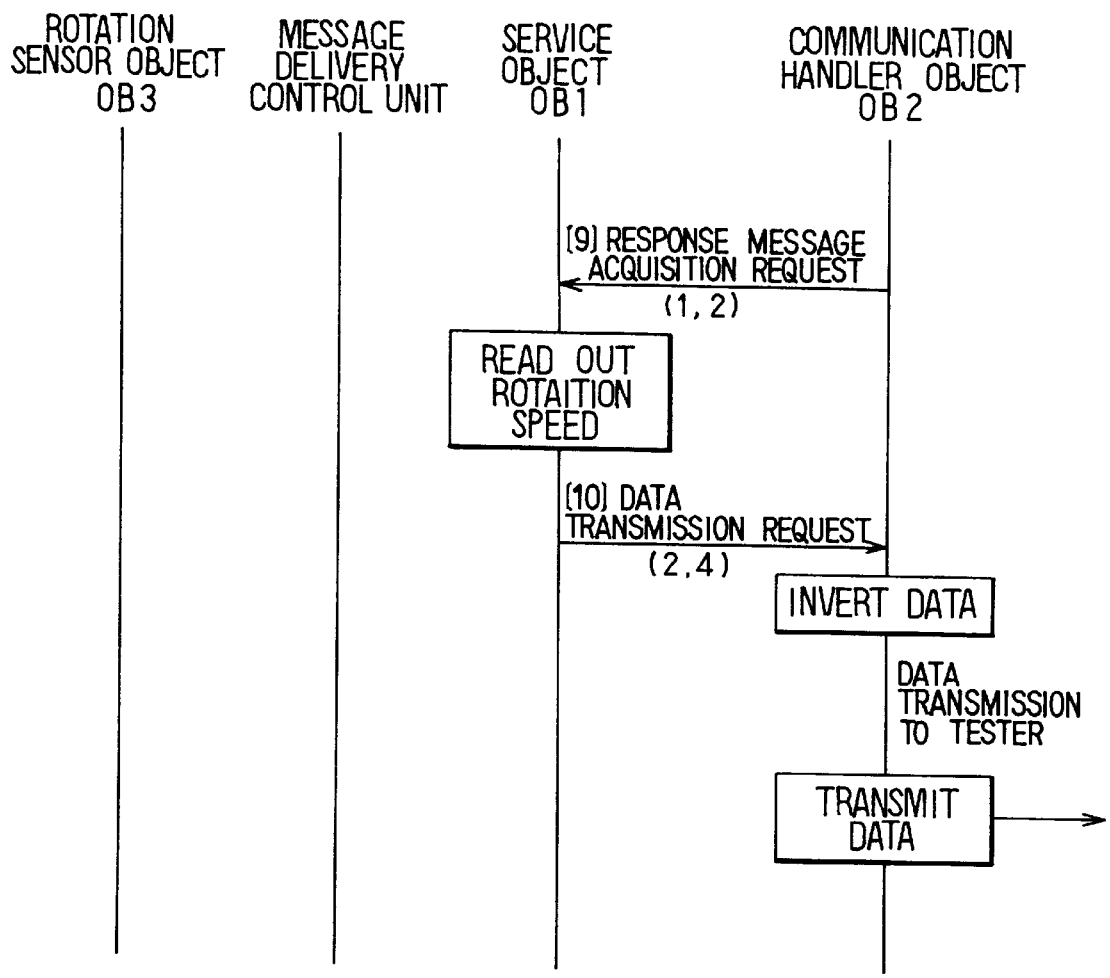
FIG. 19 is a message sequence diagram showing a response message transmission process portion enclosed in hexagonal frames in FIG. 18.

Next, the outline of the process realized by objects OB1 to OB3 shown in FIG. 2 is described with reference to message sequence charts shown in FIG. 18 and FIG. 19. Herein, an exemplary case in which the ECU 1 returns an engine rotation speed data to the tester 8 as a response message corresponding to a request message transmitted from the tester 8 is described. FIG. 19 is a message sequence chart corresponding to the response message transmission process in the hexagonal frames in FIG. 18. In FIG. 18 and FIG. 19, (2, 1) and (1, 1) represents the content (that is, OID value and MID value) of an object message (n, m) generated from objects OB1 to OB3, and (2, 1, P3) and (2, 3, P2) represents the content (that is, OID value, MID value, and timer counter value) of a timer message (n, m, P) generated from objects OB1 to OB3.

First, when a reception waiting request message is sent to the communication handler object OB2 as shown by [1] in FIG. 18, the communication handler object OB2 operates (that is, the CPU 3 executes the method of the communication handler object OB2) to set the communication circuit 7 and the serial communication interface in the microcomputer as to be ready for receiving the data from the tester 8.

A reception waiting request message is generated as a result of the process in which a timer message (2, 1, P3), which will be described hereinafter, is delivered as an object message (2, 1) by means of operation of the message delivery process (FIG. 9) and the timer clock process (FIG. 13) of the message delivery control unit 10.

After that time, when a request message is transmitted from the tester 8 and the request message is stored in the reception register in the microcomputer, a reception process request message is sent out from a predetermined object other than the objects OB1 to OB3 to the communication handler object OB2 as shown by [2] in FIG. 18.

Then, the communication handler object OB2 converts the received data in the reception register (that is, the request message supplied from the tester 8) to the data which is processable in the microcomputer, and activates the P2 timer for time counting the time t2 and the P3 timer for time counting the time t3.

The P2 timer is activated by generating a timer message (in the present example, timer message (2, 3, P2)) with a timer counter value of an integer P2 (=t2/t) obtained by dividing the time t2 by the generation period t of the timer clock request, and similarly the P3 timer is activated by generating a timer message (in the present example, timer message (2, 1, P3))with a timer counter value of an integer P3 (=t3/t) obtained by dividing the time t3 by the generation period t of the timer clock request.

Furthermore, the communication handler object OB2 sends a request message reception-notice message to the service object OB1 as shown by [3] in FIG. 18. At that time, the service object OB1 operates to send out a rotation speed acquisition request to the rotation sensor object OB3 as shown by [4] in FIG. 18.

Concomitantly with generation of the rotation speed acquisition message, the rotation sensor object OB3 operates first to figure out the engine rotation speed based on a signal supplied from the rotation sensor, and then sends out a rotation speed storage request message to the service object OB1 as shown by [5] in FIG. 18.

Then, the service object OB1 stores the engine rotation speed data figured out by the rotation sensor object OB3 (in this example, 2 bytes) in a specific area of the RAM 6. In this state, when the time t2 elapses from activation of the P2 timer, a response start request message is sent to the communication handler object OB2 as shown by [6] in FIG. 18, and the communication handler object OB2 and the service object OB1 perform response message transmission process for transmitting the response message by 1 byte to the tester 8. At that time, the response start request message is generated as a result of the process in which the timer message (2, 3, P2), which will be described hereinafter, is delivered as the object message (2, 3) by means of the operation of the message delivery process (FIG. 9) and the timer clock process (FIG. 13) of the message delivery control unit 10.

In the response message transmission process, first the communication handler object OB2 operates concomitantly with the response start request message to send a response message acquisition request message to the service object OB1 as shown by [9] in FIG. 19. Then, the service object OB1 operates to read out the engine rotation speed data by 1 byte from the specific area of the RAM 6, and sends a data transmission request message to the communication handler object OB2 as shown by [10] in FIG. 19. Concomitantly with generation of the data transmission request message, the communication handler object OB2 operates to store the engine rotation speed data of 1 byte read out from the RAM 6 by the service object OB1 which has been inverted to the data receivable for the tester 8, and then transmits 1 byte data in the transmission register to the tester 8.

The service object OB1 reads out the engine rotation speed data successively from the first byte at the head from the specific area of the RAM 6 every time when the service object OB1 operates concomitantly with generation of the response message acquisition request message. As a result, 1 byte of the response message (the engine rotation speed data) is transmitted from the ECU 1 to the tester 8 every time when the response message transmission process is performed.

Herein, the first byte of the response message is transmitted to the tester 8 when the first response message transmission process is performed, at that time the communication handler object OB2 transmits the first 1 byte of the response message to the tester 8 and then activates P1 for time counting the time t1 as shown in FIG. 18. The P1 timer is activated by generating a timer message (in this example, the timer message (2, 3, PI)) with the timer counter value which is an integer P1 (=t1/t) obtained by dividing the time t1 by the generation period t of the timer clock request.

After the time t1 from activation of the P1, a response start request message is sent again to the communication handler object OB2 as shown by [7] in FIG. 18, and the communication handler object OB2 and the service object OB1 perform the second response message transmission process. A response start request message used at that time is generated as a result of the process in which a timer message (2, 3, P1), which will be described hereinafter, is delivered as an object message (2, 3) by means of the operation of the message delivery process (FIG. 9) and the timer clock process (FIG. 13) of the message delivery control unit 10.

As a result, the communication handler object OB2 transmits the second byte of the response message to the tester 8. The communication handler object OB2 activates again the P3 timer for time counting the time t3 after transmission of the second byte of the response message.

Then, after an elapse of the time t3 from the re-activation of the P3 timer, as shown by [8] in FIG. 18, a reception waiting request message is sent to the communication handler object OB2 as in the case of [1] in FIG. 18. Concomitantly with generation of the reception waiting request message, the communication handler object OB2 operates to set the communication circuit 7 and the serial communication interface in the microcomputer so as to be ready for reception.

On the other hand, in the case that the response message is not transmitted within the time t3 from the first activation of the P3 timer for some reason, a reception waiting request message is sent to the communication handler object OB2. The communication handler object OB2 operates in response to the reception waiting request message to set the communication circuit 7 and the serial communication interface so as to be ready for reception.

The P2 timer is activated when the request message is received from the tester 8 and after an elapse of the time t2 from that time point the first byte of the response message is transmitted (that is, starting transmission of the response message), because the ECU 1 must transmit the response message after an elapse of the time t2 or longer from reception of the request message from the tester 8 as described with reference to FIG. 17.

Furthermore, the P1 timer is activated immediately after the first byte of the response message is transmitted to the tester 8 and after an elapse of the time t1 from that time point the second byte of the response message is transmitted, because the ECU 1 must transmit each byte of the response message of the same type with interval of the time t1 or longer as described with reference to FIG. 17.

Furthermore, the P2 timer is activated together with the P3 timer when a request message is received from the tester 8, because in the case that a response message is not returned from the ECU 1 within the time t3 from the transmission of a request message to the ECU 1, the tester 8 must transmit a request message again so that the request message transmitted again is received consistently.

For example, in FIG. 18, in the case that the response message transmission process shown in the hexagonal frame is not performed for some reason, after an elapse of the time t3 from the first activation of the P3 timer, the communication handler object OB2 sets the communication circuit 7 and the serial communication interface so as to be ready for reception, and a request message transmitted from the tester 8 is received thereby.

The P3 timer is re-activated immediately after the final byte (second byte) of the response message is transmitted to the tester 8 and after an elapse of the time t3 from that time point the communication circuit 7 and serial communication interface are made ready for reception, because the tester 8 transmits the next request message after an elapse of the time t3 or longer from reception of all the bytes of the response data from the ECU 1 and the request message must be received.

Next, the detail of the communication of the objects OB1 to OB3 between objects performed by means of operation of the message delivery control unit 10 and the detail of the process shown in message sequence charts in FIG. 18 and FIG. 19 are described hereinunder.

Figures 20, 21:
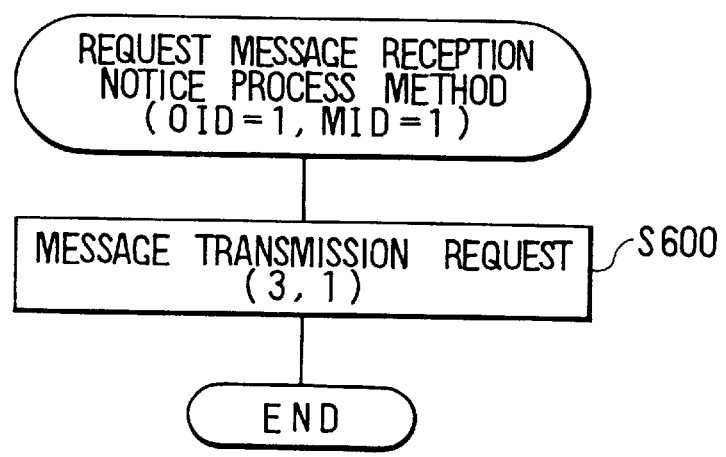
FIG. 20 is a schematic diagram showing methods of objects for controlling data communication with the tester.
FIG. 21 is a flow diagram showing a request message reception notice process method of a service object.

First, as shown in FIG. 20, a service object OB1 has a request message notice process method (FIG. 21) which is executed concomitantly with an object message (1, 1) served as the request message reception notice message shown by [3] in FIG. 18, that is, an object message with OID of 1 and MID of 1, a response message acquisition process method (FIG. 22) which is executed concomitantly with an object message (1, 2) served as the response message acquisition request message shown by [9] in FIG. 19, and a rotation speed storage process method (FIG. 23) which is executed concomitantly with an object message (1, 3) served as the rotation speed storage request message shown by [5] in FIG. 18.

On the other hand, a communication handler object OB2 has a reception waiting process method (FIG. 24) which is executed concomitantly with an object message (2, 1) served as the reception waiting request message shown by [1] and [8] in FIG. 18, a tester reading process method (FIG. 25) which is executed concomitantly with an object message (2, 2) served as the reception process request message shown by [2] in FIG. 18, a response start process method (FIG. 26) which is executed with concomitantly with an object message (2, 3) served as the response start request message shown by [6] and [7] in FIG. 18, and a transmission process method (FIG. 27) which is executed concomitantly with an object message (2, 4) served as the data transmission request message shown by [10] in FIG. 19.

Furthermore, a rotation sensor object OB3 has a rotation speed acquisition process method (FIG. 28) which is executed concomitantly with an object message (3, 1) served as the rotation speed acquisition request message shown by [4] in FIG. 18. The respective execution start addresses of the objects OB1 to OB3 are registered previously in the connection information database 16 corresponding to OID and MID which indicate respective methods.

Next, the detail of the process performed by the CPU 3 is described.

First, when the tester 8 transmits a request message served as a data request and the request message is received while the communication circuit 7 and the serial communication interface in the microcomputer are made ready for reception by means of S700 of the reception waiting process method (FIG. 24) described hereinafter (in detail, when the request message is stored in the reception register of the serial communication interface as a reception data), the method of the predetermined object other than the objects OB1 to OB3 (referred to as communication operation activation method hereinafter) is executed to generate a message transmission request (2, 2).

It is assumed in the description described hereinunder that the message delivery control unit 10 is in the state of message delivery at the time point when the request message from the tester 8 is received and there is no memory block in the object message storage unit 12 and the timer message storage unit 13. Furthermore, there are sufficient free memory blocks in the free memory block storage unit 14, and YES determination is found always in the message queuing process S100 shown in FIG. 7 and the timer message queuing process S300 shown in FIG. 11.

Herein, when the message transmission request (2, 2) is generated, the message queuing process shown in FIG. 7 is executed, and the object message (2, 2) is queued in the object message storage unit 12.

In detail, the head free memory block is acquired from the free memory block storage unit 14 in S110 shown in FIG. 7, the object message (2, 2) is stored in the acquired free memory block in S120, and then the memory block in which the object message (2, 2) has been stored is registered in the object message storage unit 12 as an object message block in S130.

When the queuing of the object message (2, 2) is completed as described above, the execution of the process returns to the communication operation activation method. When the process of the method is completed, the message delivery process shown in FIG. 9 is performed and the object message (2, 2) queued in the object message storage unit 12 is delivered.

In detail, first whether the object message is queued in the object message storage unit 12 is checked in S210 in FIG. 9, however, in this case, because only the object message (2, 2) is queued, the content of the object message (2, 2) is read out from the object message block located at the head of the object message storage unit 12 in S220. The object message block in which the object message (2, 2) has been stored is returned to the free memory block storage unit 14 as a free memory block.

An execution start address of the tester reading process method of the communication handler object OB2 corresponding to the content of the read object message (2, 2) is figured out from the connection information database 16 in S240 shown in FIG. 9, and the figure out execution start address is called in S250.

The object message (2, 2) is thereby delivered, and the execution of the tester reading processing method shown in FIG. is started.

Figure 25:
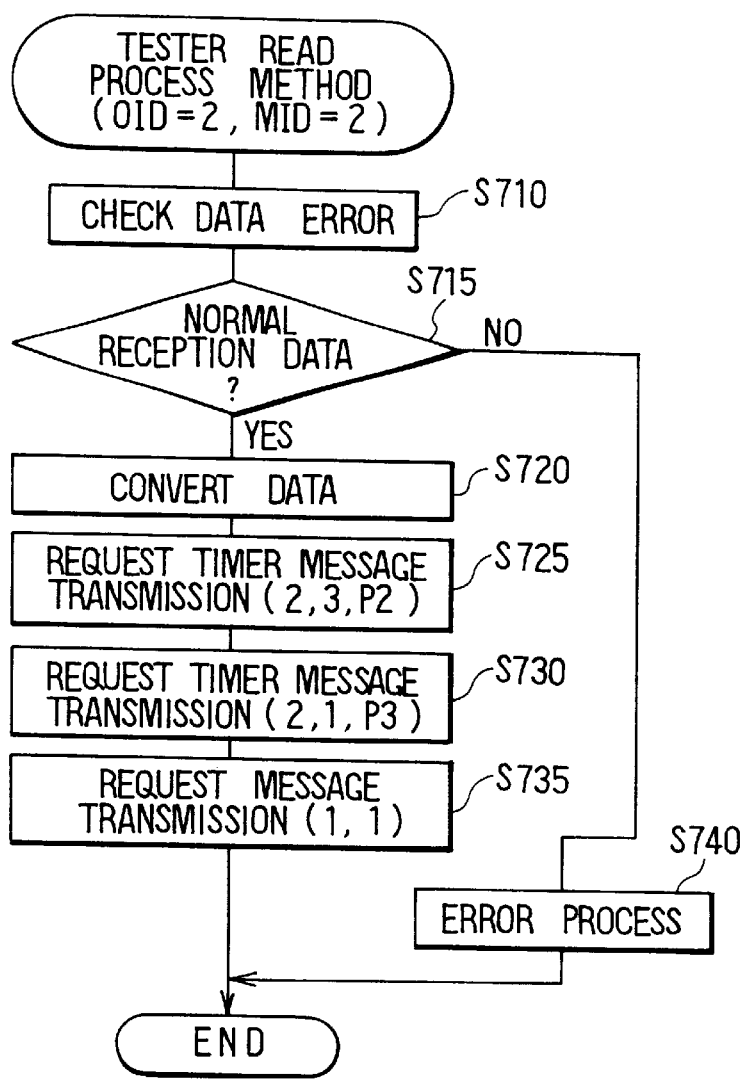
FIG. 25 is a flow diagram showing a tester reading process method of the communication handler object.

As shown in FIG. 25, when the execution of the tester reading process method is started, the reception data in the reception register is subjected to data error check in S710, and in the subsequent S715, whether the reception data is normal is checked based on the data error check result.

If it is found that the reception data is not normal, then the execution of the method is brought to an end, on the other hand if it is found that the reception data is normal, then the reception data is converted to a data which is processable in the microcomputer in S720 and the converted data is transferred to the RAM 6.

Furthermore, in the subsequent S725, a timer message transmission request (2, 3, P2) is generated to activate the P2 timer shown in FIG. 18.

Then, the timer message queuing process shown in FIG. 11 is performed and the timer message (2, 3, P2) is queued in the timer message storage unit 13. In detail, the head free memory block is acquired from the free memory block storage unit 14 in S310 shown in FIG. 11, the timer message (2, 3, P2) is stored in the acquired free memory block in S320, and then the memory block in which the timer message (2, 3, P2) has been stored is registered in the timer message storage unit 13 as a timer message block in S330.

When the queuing of the timer message (2, 3, P2) has been completed as described above, the execution of the process returns to the tester reading process method shown in FIG. 25, and a timer message transmission request (2, 1, P3) is generated in FIG. 25 to activate the P3 timer shown in FIG. 18 in S730.

Then, the timer message queuing process shown in FIG. 11 is performed again, the timer message (2, 1, P3) is queued in the timer message storage unit 13.

In detail, the head free memory block is acquired from the free memory block storage unit 14 in S310 shown in FIG. 11, the timer message (2, 1, P3) is stored in the acquired free memory block in S320, and then the memory block in which the timer message (2, 1, P3) has been stored is registered at the tail of the timer message block in the timer message storage unit 13 (in this case, the second position from the head) as a timer message block in S330.

At that time point, two timer message blocks, that is, the timer message block in which the timer message (2, 3, P2) is stored and the timer message block in which the timer message (2, 1, P3) is stored, are registered in this order. In other words, two timer messages are stored in the timer message storage unit 13 in the order the timer message (2, 3, P2)→the timer message (2, 1, P3).

When the queuing of the timer message (2, 1, P3) is completed as described above, the execution of the process returns again to the tester reading process method shown in FIG. 25, and a message transmission request (1, 1) is generated in S735 shown in FIG. 25.

Then, the message queuing process shown in FIG. 7 is performed, and an object message (1, 1) is queued in the object message storage unit 12 in the quite same manner as described above.

When the queuing of the object message (1, 1) has been completed, the execution of the process returns to the tester reading process method shown in FIG. 25, and when the execution of this method is completed, and the message delivery process shown in FIG. 9 is performed and the object message (1, 1) queued in the object message storage unit 12 is delivered.

The execution of the request message reception notice process method shown in FIG. 21 is started thereby. A message transmission request (3, 1) is generated in S600. Then, the message queuing process shown in FIG. 7 is performed and the object message (3, 1) is queued in the object message storage unit 12.

When the queuing of the object message (3, 1) has been completed, the execution of the process returns to the request message reception notice process method shown in FIG. 21, and when the execution of this method is completed, the message delivery process shown in FIG. 9 is performed and the object message (3, 1) queued in the object message storage unit 12 is delivered.

The execution of the rotation speed acquisition process method is thereby started. The engine rotation speed is figured out based on the signal from the rotation sensor in S800, and a message transmission request (1, 3) is generated in the subsequent S810. Then, the message queuing process shown in FIG. 7 is performed, and the object message (1, 3) is queued in the object message storage unit 12.

Figure 28:
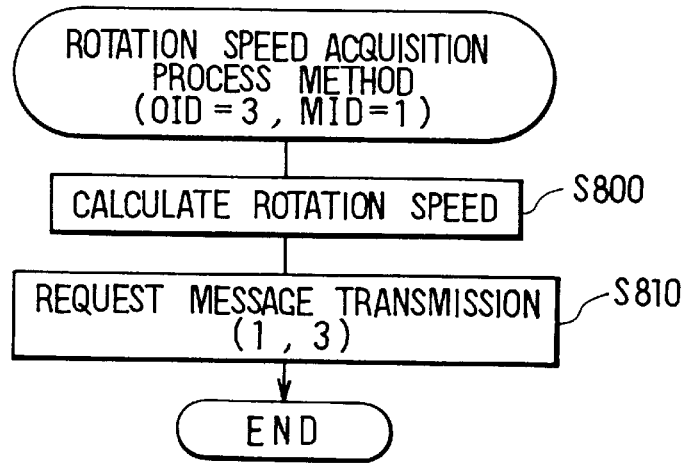
FIG. 28 is a flow diagram showing a rotation speed acquisition process method of a rotation sensor object.

After queuing of the object message (1, 3), the execution of the process returns to the rotation speed acquisition process method shown in FIG. 28, and when the process of this method is completed, the message delivery process shown in FIG. 9 is performed, and the object message (1, 3) queued in the object message storage unit 12 is delivered.

Figure 23:
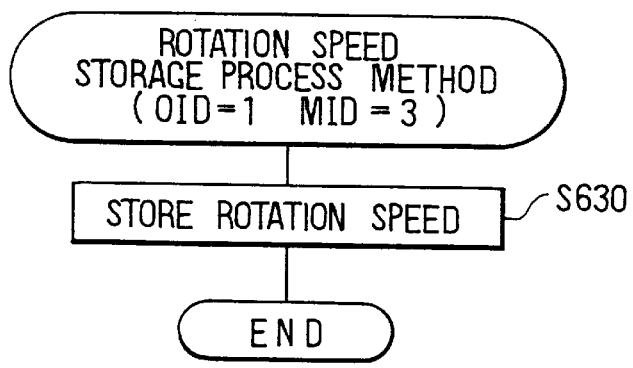
FIG. 23 is a flow diagram showing a rotation speed storage process method of the service object.

The execution of rotation speed storage process method shown in FIG. 23 is thereby started. The engine rotation speed data figured out in S800 of the rotation speed acquisition process method is stored in the specific area of the RAM 6 in S630, and then the execution of the rotation speed acquisition process method is brought to an end.

Then, message delivery process shown in FIG. 9 is performed, and whether an object message is queued in the object message storage unit 12 is checked in S210, however, in this case, because there is no queued object message, the message delivery control unit 10 is brought into the state of message reception waiting.

It is assumed that, for example, the method which is the method of an object other than the objects OB1 to OB3 and which is executed every predetermined time (referred to as fixed time method hereinafter) is executed and a message transmission request (x1, y1) is generated concomitantly with execution of the fixed time method.

Then, the message queuing process shown in FIG. 7 is performed and the object message (x1, y1) is queued in the object message storage unit 12, and when the queuing of the object message (x1, y1) has been completed, the sequence returns to the fixed time method.

Then, the fixed time method is executed and a message delivery request is generated, the message delivery control unit 10 is brought into the state of message delivery and message delivery process shown in FIG. 9 is performed, and the object message (x1, y1) queued in the object message storage unit 12 is delivered.

As a result, the method of the object with OID of x1 and MID of y1 is executed and the message transmission request (x2, y2) is thereby generated, then the method of the object with OID of x2 and MID of y2 is executed, and furthermore the execution of the method results in generation of a message transmission (x3, y3) and then the method of the object with OID of x3 and MID of y3 is executed. As described above, respective methods of other objects are executed successively.

After an elapse of the time t2 from the time point when the timer message (2, 3, P2) generated in S725 for the tester reading process method shown in FIG. 25 has been queued in the timer message storage unit 13, the timer counter of the timer message (2, 3, P2) reaches 0 as a result of the timer clock process in S410 shown in FIG. 13.

The timer message (2, 3, P2) is re-queued from the timer message storage unit 13 to the object message storage unit 12 in the timer clock process S430 as an object message (2, 3). At this time point, only the timer message (2, 1, P3) is stored in the timer message storage unit 13.

At the time point when execution of a method in execution is completed, the re-queued message (2, 3) is delivered in the message delivery process shown in FIG. 9 in the quite same manner as applied to deliver an original object message generated from an object.

Figure 26:
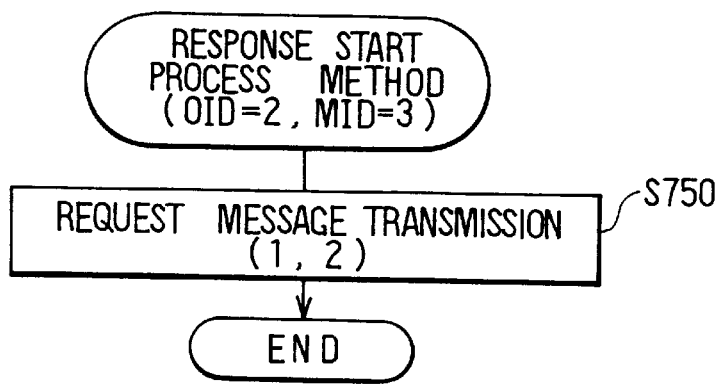
FIG. 26 is a flow diagram showing a response start process method of the communication handler object.

As a result, after an elapse of the time t3 from the time point when the timer message (2, 3, P2) has been queued in the timer message storage unit 13, the execution of the response start process method shown in FIG. 26 corresponding to the object message (2, 3) is started.

As shown in FIG. 26, when the execution of the response start process method is started, a message transmission request (1, 2) is generated in S750.

Then, the message queuing process shown in FIG. 7 is performed and the object message (1, 2) is queued in the object message storage unit 12.

After queuing of the object message (1, 2), the sequence returns to the response start process method shown in FIG. 26, and when the execution of this method is completed, the message delivery process shown in FIG. 9 is performed and the object message (1, 2) queued in the object message storage unit 12 is delivered.

Figure 22:
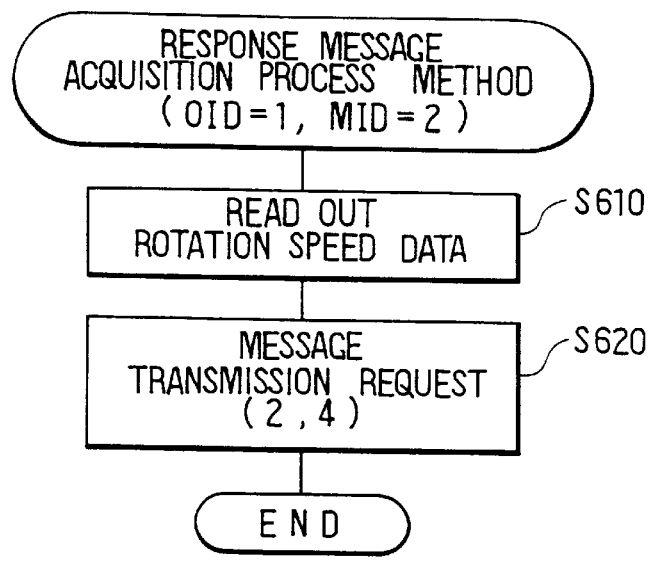
FIG. 22 is a flow diagram showing a response message acquisition process method of the service object.

As a result, execution of the response message acquisition process method shown in FIG. 22 is started, and first the engine rotation speed data of 1 byte to be transmitted from the specific area of the RAM 6 to the tester 8 is read out in S610. In S610, the engine rotation speed data is read out from the specific area of the RAM 6 every time when the process of S610 is performed first from the head 1 byte successively.

In the subsequent S620, a message transmission request (2, 4) is generated.

Then, the message queuing process shown in FIG. 7 is performed, and the object message (2, 4) is queued in the object message storage unit 12.

When the queuing of the object message (2, 4) is completed, the sequence returns to the response message acquisition process method shown in FIG. 22, and when execution of this method is completed, the message delivery process shown in FIG. 9 is performed and the object message (2, 4) queued in the object message storage unit 12 is delivered.

Figure 27:
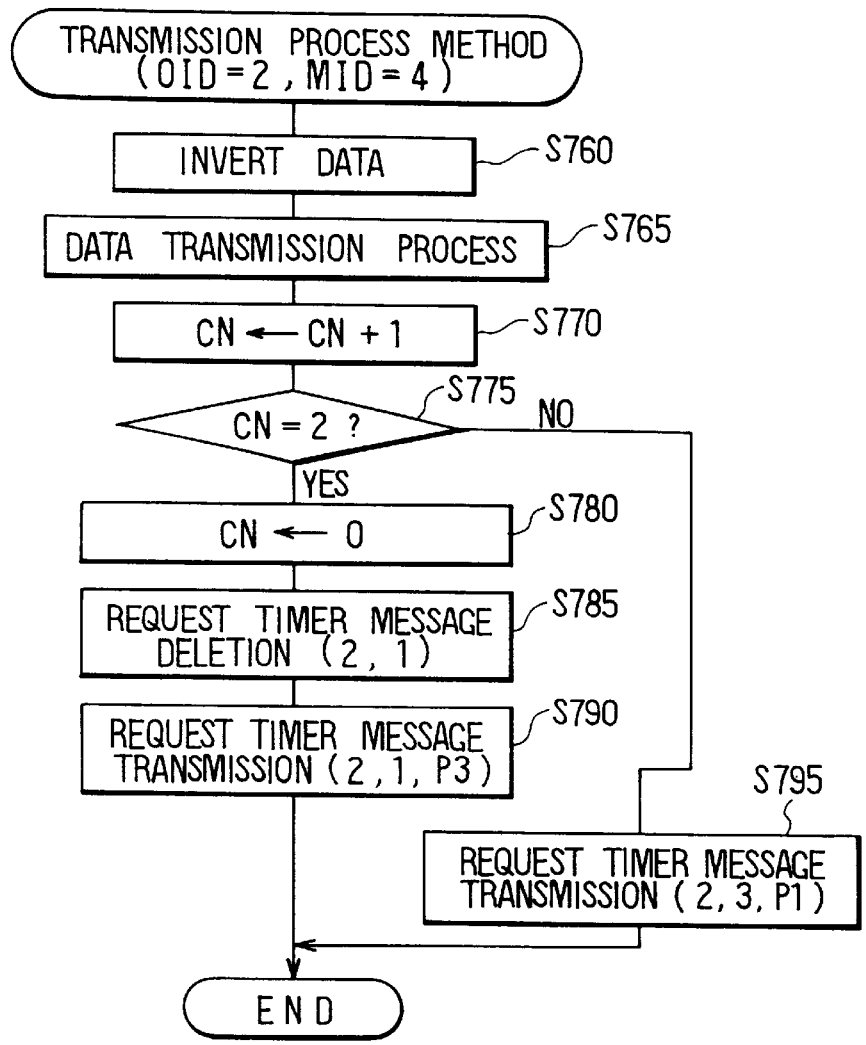
FIG. 27 is a flow diagram showing a transmission process method of the communication handler object.

As a result, execution of the transmission process method shown in FIG. 27 is started.

As shown in FIG. 27, when execution of the transmission process method is started, the engine rotation speed data of 1 byte read out from the RAM 6 in S610 of the response message acquisition process method is inverted to the data which is ready for reception for the tester 8 side in S760, and then transferred to the transmission resister of the serial communication interface. In the subsequent S765, the 1 byte data in the transmission register is transmitted to the tester 8.

Next in S770, the counter CN for counting the number of bytes of the data (response message) transmitted to the tester 8 is incremented by 1, and in the subsequent S775, whether the value of the counter CN is 2 is checked. The initial value of the counter CN is 0.

Because the value of the counter CN is 1 yet at the time point when the first 1 byte of the. response message is transmitted to the tester 8, check result NO is obtained in the S775, and the sequence proceeds to S795. In S795, a timer message transmission request (2, 3, P1) is generated to activate the P1 timer shown in FIG. 18.

Then, the timer message queuing process shown in FIG. 11 is performed, and the timer message (2, 3, P1) is queued in the timer message storage unit 13 in the quite same manner as described above. Two timer messages, that is, the timer message (2, 3, P1) and the timer message (2, 1, P3), are stored in the timer message storage unit 13 at this time point.

After completion of queuing of the timer message (2, 3, P1), the sequence returns again to the transmission process method shown in FIG. 27. However, if the first 1 byte of the response message is received (in detail, if check result NO is obtained in S775 shown in FIG. 27 and not in the case that the final byte of the response message is transmitted), then execution of the transmission process method is brought to an end as it is.

Then the message delivery process shown in FIG. 9 is performed, whether an object message is queued in the object message storage unit 12 is checked. However, in this case, because there is no queued object message, the message delivery control unit 10 is brought into the state of message reception waiting.

After that, the message delivery control unit 10 returns to the state of message delivery as processed in the time from the completion of execution of the rotation speed acquisition process method (FIG. 23) to the first starting of execution of the response start process method (FIG. 26), and respective methods of other objects are executed successively.

After an elapse of the time t1 from the time point when the timer message (2, 3, P1) in S795 of the transmission process method shown in FIG. 27 is queued in the timer message storage unit 13, the timer counter of the timer message (2, 3, P1) reaches 0 as a result of the timer clock process of S410 shown in FIG. 13.

The timer message (2, 3, P1) is re-queued from the timer message storage unit 13 to the object message storage unit 12 as an object message (2, 3) as a result of the timer clock process of S430. Only the timer message (2, 1, P3) is stored in the timer message storage unit 13 at this time point.

Furthermore, the re-queued message (2, 3) is delivered in the message delivery process shown in FIG. 9 at the time point when the execution of a method in execution is completed in the quite same manner as in the case of an original object message generated from an object.

The execution of the response start process method shown in FIG. 26 corresponding to the object message (2, 3) is started when the time t1 elapses from the queuing of the timer message (2, 3, P1) in the timer message storage unit 13 in the quite same way as in the case that the time t2 elapses from the queuing of the timer message (2, 3, P2) in the timer message storage unit 13. In the next to the response start process method, the response message acquisition process method shown in FIG. 22 is executed, and in the next the transmission process method shown in FIG. 27 is performed.

As a result of second execution of the response message acquisition process method and the transmission process method, the second byte that is, the final byte of the response message is transmitted to the tester 8. In the transmission of the second byte, the value of the counter CN is determined to be 2, that is, check result YES is obtained in S775 for the transmission process method shown in FIG. 27, and the value of the counter CN is initialized to 0 in the next S780.

First in S785, a timer message deletion request (2, 1) is generated to reactivation of the P3 timer shown in FIG. 18.

At that time, the timer message deletion process shown in FIG. 15 is performed and the timer message (2, 1, P3) is deleted from the timer message storage unit 13.

In detail, first in S500 shown in FIG. 15, the timer message (2, 1, P3) with OID and MID which are identical with those of the timer message deletion request (2, 1) is selected in the timer message storage unit 13 as a deleting target timer message, the storage content of the timer message block in which the timer message (2, 1, P3) is stored is deleted in S520, and the timer message block from which the stored content has been deleted is returned from the timer message storage unit 13 to the free memory block storage unit 14 as a free memory block.

After completion of deleting of the timer message (2, 1, P3) as described above, then the sequence returns to the transmission process method shown in FIG. 27, and a timer message transmission request (2, 1, P3) is generated in S790 shown in FIG. 27. Then, the timer message queuing process shown in FIG. 11 is performed, a timer message (2, 1, P3) is queued newly in the timer message storage unit 13, and the re-activation of the P3 timer shown in FIG. 18 is completed.

After queuing of the timer message (2, 1, P3), the sequence returns again to the transmission process method shown in FIG. 27, and when the execution of this method is completed, the message delivery process shown in FIG. 9 is performed. However, because there is no object message queued in the object message storage unit 12 in this case, check result NO is obtained in S210 shown in FIG. 9, and the message delivery control unit is brought into the state of message reception waiting.

After that, the message delivery control unit 10 returns to the state of message delivery as in the time from the completion of execution of the rotation speed acquisition process method (FIG. 23) to the first starting of execution of the response start process method (FIG. 26), and respective methods of other objects are executed successively.

After an elapse of the time t3 from the time point when the timer message (2, 1, P3) generated in S790 of the transmission process shown in FIG. 27 is queued in the timer message storage unit 13 (that is, from the re-activation of the timer P3), the timer counter of the timer message (2, 1, P3) reaches 0 as a result of the timer clock process S410 shown in FIG. 13, and the timer message (2, 1, P3) is re-queued from the timer message storage unit 13 to the object message storage unit 12 as an object message (2, 1) as a result of the timer clock process in S430. Furthermore, the re-queued message (2, 1) is delivered as a result of the message delivery process shown in FIG. 9 at the time point when execution of a method in execution is completed.

Figure 24:
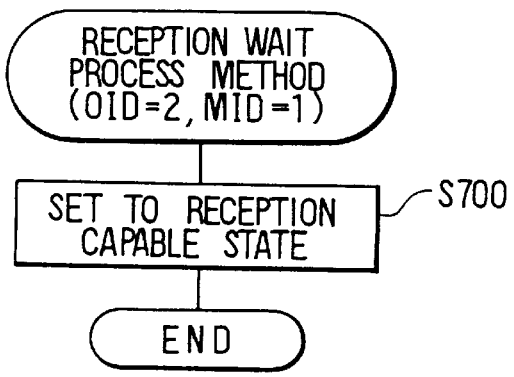
FIG. 24 is a flow diagram showing a reception waiting process method of a communication handler object.

After an elapse of the time t3 from the transmission of the final byte (second byte) of the response message to the tester 8, the execution of the reception waiting process method shown in FIG. 24 corresponding to the object message (2, 1) is started.

When execution of the reception waiting process method is started as shown in FIG. 24, the communication circuit 7 and the serial communication interface in the microcomputer are set so as to be ready for reception in S700, and then the execution of the reception waiting process method is completed.

Then, the message delivery process shown in FIG. 9 is performed, however, because there is no object message queued in the object message storage unit 12 in this case, check result NO is obtained in S210 shown in FIG. 9, and the message delivery control unit 10 is brought into the state of message reception waiting.

After that, the message delivery control unit 10 returns to the state of message delivery as in the time from the completion of execution of the rotation speed acquisition process method (FIG. 23) to the first starting of execution of the response start process method (FIG. 26), and respective methods of other objects are executed successively. When the next request message is received from the tester 8, the communication operation activation method is executed and a message transmission request (2, 2) is generated, and the respective processes for transmission of the response message to the tester 8 are performed again successively.

On the other hand, if a response message is not transmitted for some reason within the time t3 from that time point although a request message is received normally from the tester 8, the S785 of the transmission process method shown in FIG. 27 is not executed, and a timer message deletion request (2, 1) is not generated.

As a result, in the case that a response message is not transmitted for some reason, after an elapse of the time t3 from the time point when the timer message (2, 1, P3) generated in S730 of the tester reading process method shown in FIG. 25 has been queued in the timer message storage unit 13 (that is, from the first activation of the P3 timer), the timer counter of the timer message (2, 1, P3) reaches 0 as a result of S410 of the timer clock process, and the timer message (2, 1, P3) is re-queued from the timer message storage unit 13 to the object message storage unit 12 as an object message (2, 1) as a result S430 of the timer clock process. The re-queued message (2, 1) is delivered by means of the message delivery process shown in FIG. 9.

As a result, also in the case that the time t3 elapses without transmission of a response message from reception of a request message from the tester 8, execution of the reception waiting process method shown in FIG. 24 is started, the communication circuit 7 and the serial communication interface are set so as to be ready for reception in S700, and are made ready for reception of a request message which will be re-transmitted from the tester 8.

Respective methods of objects OB1 to OB3 shown in FIG. 21 to FIG. 28 are executed successively as described above, the process for controlling the data communication with the tester 8 is thereby performed in the order shown in the message sequence charts in FIG. 18 and FIG. 19.

In the present embodiment, the queuing process shown in FIG. 7 corresponds to the first storage control means, and the message delivery process shown in FIG. 9 corresponds to the activation control means. The timer message queuing process shown in FIG. 11 corresponds to the second storage control means, and the timer clock process corresponds to the delay control means. Furthermore, the timer message queuing process shown in FIG. 11 corresponds to the timer message storage control means, and the timer clock process shown in FIG. 13 and the message delivery process shown in FIG. 9 are equivalent to the delay activation control means. The timer message deletion process shown in FIG. 15 corresponds to the deleting means, and the ROM 5 and the connection information database stored in the ROM 5 are equivalent to the storage position storage means.

As described above, in the ECU 1 of the present embodiment, when an object message (message transmission request) which contains no timer counter is generated, message queuing process shown in FIG. 7 is performed, and the object message is stored (queued) in the object message storage unit 12.

The message delivery process shown in FIG. 9 is performed at the time point when execution of some method is completed, the object message which is stored first out of object messages stored in the object message storage unit 12, the method of the object corresponding to the destination of the read out object message is executed, and then the read out object message is deleted from the object message storage unit 12.

Therefore, according to the ECU 1 of the present embodiment, methods of respective objects are executed in real time. The present embodiment is not disadvantageous in real time operation capability unlike the case to which flag check technique is applied for message communication between objects, and the method of each object can be executed in event driven.

Because the present embodiment is not the case in which the method of an object in execution is interrupted to execute the method of another object unlike the case in which the function call technique is applied for message communication between objects, the method of each object can be executed without consuming a lot of memory resources in the present embodiment. In detail, in the case that the function call technique is applied for message communication between objects, the value of the program counter of the microcomputer and various registers (not shown in the drawing) must be stored, on the other hand in the case of the ECU 1 of the present embodiment, only the message is stored, and the significantly smaller amount of information to be stored is sufficient for operation.

In the ECU 1 of the present embodiment, an object message read out from the object message storage unit 12 and delivered is deleted from the object message storage unit 12. In detail, the memory block in the object message storage unit 12 in which memory block the read out object message has been stored is returned to the free memory block storage unit 14. As a result, an unnecessary object message does not remain in the object message storage unit 12, and the memory area of the RAM 6 that is, the memory resource is used effectively.

Furthermore, in the ECU 1 of the present embodiment, a timer message (timer message transmission request) which contains a timer counter is generated as a result of execution of the method of an object, the timer message queuing process shown in FIG. 11 is performed and the timer message is stored (queued) in the timer message storage unit 13.

The timer clock process shown in FIG. 13 is performed every time when a timer clock request is generated with the time interval of the predetermined time t to reduce by 1 the timer counter of the timer message stored in the timer message storage unit 13, and the timer message with the timer counter which reaches 0 is re-stored in the object message storage unit 12 as an object message. The timer message re-stored in the object message storage unit 12 as an object message is read out by means of the message delivery process shown in FIG. 9 in the quite same manner as in the case of an original object message generated from an object. As a result the method of the object specified by the OID and MID of the message is executed.

Therefore, after an elapse of the time equivalent to the timer counter of the timer message from the time point when the timer message is generated as a result of execution of the method of the object, the method of the object which is specified by OID and MID of the timer message is executed.

As a result, according to the ECU 1 of the present embodiment, the method of each object is executed in real-time without consuming a lot of memory resources, and additionally the time waiting process, that is, execution of the method of a specified object is started after an elapse of a predetermined time from a certain time point, is realized easily.

For example, in the embodiment shown in FIG. 17 to FIG. 28, execution of the response start process method shown in FIG. 26 can be started after an elapse of the time t2 from the time point when the timer message (2, 3, P2) has been generated in S725 of the tester reading process method shown in FIG. 25 (from activation of the P2 timer shown in FIG. 18), or the execution of the response start process method shown in FIG. 26 can be started after an elapse of the time t1 from the time point when the timer message (2, 3, P1) has been generated in S795 of the transmission process method shown in FIG. 27 (from the activation of the P1 timer shown in FIG. 18). Furthermore, the execution of the reception waiting process method shown in FIG. 24 can be started after an elapse of the time t3 from the time point when the timer message (2, 1, P3) has been generated in S790 of the transmission process method shown in FIG. 27 (from re-activation of the P3 timer shown in FIG. 18).

Furthermore according to the ECU 1 of the present invention, methods of other objects can be executed successively within the time while the timer counter of the timer message stored in the timer message storage unit 13 reaches 0, unnecessary time consumption during the process is saved.

In the ECU 1 of the present embodiment, the timer message storage unit 13 is capable of storing a plurality of timer messages, and in the timer clock process shown in FIG. 13, timer counters of all the timer messages are reduced one by one, and a timer message with the timer counter which reaches 0 is re-stored from the timer message storage unit 13 to the object message storage unit 12 as an object message.

Therefore, according to the ECU 1 of the present embodiment, in the state that a plurality of timer messages are stored in the timer message storage unit 13, respective times for delaying execution starting of a plurality of methods is counted in parallel, and the time waiting process of a plurality of series can be performed easily.

For example, in the detailed example shown in FIG. 17 to FIG. 28, the time t2 from the time point when the timer message (2, 3, P2) has been generated in S725 of the tester reading process method shown in FIG. 25 (from the activation of the P2 timer shown in FIG. 18) to the starting of execution of the response start process method shown in FIG. 26 and the time t3 from the time point when the timer message (2, 1, P3) has been generated in S730 of the tester reading process method shown in FIG. 25 (from the first activation of the P3 timer shown in FIG. 18) to the starting of execution of the reception waiting process method shown in FIG. 24 can be counted in parallel. Furthermore, the time t1 from the time point when the timer message (2, 3, P1) has been generated in S795 of the transmission process method shown in FIG. 27 (activation of the P1 timer shown in FIG. 18) to the starting of execution of the response start process method shown in FIG. 26 and the time t3 from the time point when the timer message (2, 1, P3) has been generated in S730 of the tester reading process method shown in FIG. 25 to the starting of execution of the reception waiting process method shown in FIG. 24 can be counted in parallel.

Furthermore, in the ECU 1 of the present embodiment, a 1s LI timer message re-stored in the object message storage unit 12 as an object message is deleted from the timer message storage unit 13. In detail, a memory block of the timer message storage unit 13 in which memory block the timer message has been stored is transferred to the object message storage unit 12. As a result, a timer message which becomes unnecessary for the timer message storage unit 13 (that is, a timer message with the timer counter which reaches 0) does not remain in the timer message storage unit 13, and the memory area of the RAM 6 that is, the memory resource is used effectively.

Furthermore, in the ECU 1 of the present embodiment, when a timer message deletion request is generated as a result of execution of the method of an object, the timer message deletion process shown in FIG. 15 is performed to delete the timer message with OID and MID, which are identical with those of the timer message deletion request, from the timer message storage unit 13.

Therefore, according to the ECU 1 of the present embodiment, the time out process, that is, the method of a specific object is executed unless the process of a monitoring target is not performed within an elapse of a predetermined time from a certain time point, is realized easily without providing a special means such as timer interruption mechanism.

For example, in the detailed example-shown in FIG. 17 to FIG. 28, because a timer-message deletion request (2, 1) is generated in S785 of the transmission process method unless the transmission process method shown in FIG. 27 is executed twice within the time t3 from the time point when the timer message (2, 1, P3) is generated in S730 of the tester reading process method shown in FIG. 25 (from the first activation of the P3 timer shown in FIG. 18), and when the time t3 elapses from the first activation of the P3 timer shown in FIG. 18, the reception waiting process method shown in FIG. 24 is executed as the method of the specific object.

On the other hand, furthermore in the ECU 1 of the present embodiment, a message which is generated as a result of execution of the method of an object contains OID (object identification number) and MID (method identification number) that is, the identification code for indicating the method of the destination object. In addition, the ECU 1 of the present embodiment is provided with a connection information database 16 which stores the combination of OID and MID and the execution start address served as storage position information that is, the head address of the ROM 5 in which respective methods of objects indicated by respective combinations are stored correspondingly. In the message delivery process shown in FIG. 9, an execution start address of the method of an object corresponding to the OID and MID of an object message read out from the object message storage unit 12 is specified based on the memory content of the contact information database 16, and the method of the destination object of the read out object message is executed.

Therefore, in the case that the storage position in the ROM 5 of the method which constitutes an object is changed due to amendment of the object concomitantly with program design change, the storage position change is accommodated only by changing the content of the connection information database 16. In other words, the independence of the object is improved, and the program design change is easy.

One embodiment of the present invention is described hereinabove, however, the present invention is by no means limited to the embodiment, various modification may be applied.

For example, in the embodiment, the timer clock request which is an event for activating the timer clock process shown in FIG. 13 is generated every predetermined time t, however, the timer clock request may be structured so as to be generated correspondingly to the event which is asynchronous with time, for example, at the time when a pulse signal is generated from the rotation sensor. For example, in the case that a timer clock request is generated at the time when a pulse signal is generated from the rotation sensor, the timer counter of each timer message stored in the timer message storage unit 13 is subtracted by 1 every time when a pulse signal is generated from the rotation sensor.

In the embodiment, all the objects are stored in one ROM 5, however, in the case that methods of objects are stored in a plurality of ROMs, the information which indicates a specified execution start address of a specified ROM may be stored as the storage position information in the contact information database 16.

On the other hand, the ECU 1 of the embodiment is applied to control an engine of a vehicle, however, the present invention may be applied to electronic control apparatus for controlling other control targets such as automatic transmissions and vehicle suspensions in quite the same manner as used for engine control.

What is claimed is:

1. An electronic control apparatus provided with a plurality of unit processing means for performing processes for realizing unit functions according to object-oriented programming that is methods of objects formed by dividing a control program into unit functions corresponding to respective objects in which any one of the plurality of unit processing means performs process operation alternatively and the unit processing means generate a message served as a process request which indicates a unit processing means as the destination during the process operation, and the unit processing means which corresponds to the destination of the message thereby performs the process, the message generated by the unit processing means is categorized into a first type message which contains no count value for indicating the delay time until the time when the unit processing means corresponding to the destination of the message starts process operation and a second type message which contains a count value, wherein the electronic control apparatus comprises:
first storage control means that stores the first type message generated by the unit processing means in a first message storage means;
activation control means that reads out the first type message firstly stored among first type messages stored in the first message storage means at the time point when any one of the plurality of unit processing means completed the process operation, controls the unit processing means corresponding to the destination of the read first type message to start the process, and deletes the read out first type message from the message storage means;
second storage control means that stores the second type message generated from the unit processing means in the second message storage means and
delay control means that reduces the count value of the second type message stored in the second message storage means every time when a predetermined event occurs and re-stores the second type message in the first message storage means as the first type message when the count value reaches a predetermined value.

2. An electronic control apparatus according to claim 1, wherein:
the second message storage means is structured so as to be capable of storing a plurality of the second type messages; and
the delay control means is structured so as to reduce the count value of all the second type messages stored in the second message storage means by a predetermined value every time when the event occurs and re-store the second type message with the count value which has reached the predetermined value in the first message storage means as the first type message.

3. An electronic control apparatus according to claim 1, wherein:
the delay control means is structured so as to delete the second type message which has re-stored as the first type message from the second message storage means.

4. An electronic control apparatus according to claim 1, further comprising:

deleting means that, when a deleting request of the second type message for indicating a unit process means is generated from the unit process means, deletes the second type message corresponding to the deleting request from the second message storage means.

5. An electronic control apparatus-according to claim 1, wherein:

the method of the object is stored in predetermined program storage means;

an identification code for indicating the method of the object corresponding to the unit process means which is the destination of the message in the first and second type messages, and the activation control means is provided with storage position storage means that stores an identification code and the storage position information that represents the storage position of the method indicated by the identification code in the program storage means, and is structured so as to specify the storage position in the program storage means of the method indicated by the identification code contained in the first type message read out from the first message storage means and to thereby control the unit processing means corresponding to the destination of the read out first type message to start the process.

6. An electronic control apparatus according to claim 5, wherein:

the storage position information is the address that indicates the memory area of the program storage means.

* * * * *

UNITED STATES PATENT AND TRADEMARK OFFICE
CERTIFICATE OF CORRECTION

PATENT NO. : 6,665,566 B1 Page 1 of 1
DATED : December 16, 2003
INVENTOR(S) : Shibata et al.

It is certified that error appears in the above-identified patent and that said Letters Patent is hereby corrected as shown below:

Title page,
Item [54], Title, should read as follows:
-- [54]  ELECTRONIC CONTROL APPARATUS OPERABLE ON OBJECT-ORIENTED PROGRAM --

Signed and Sealed this

Eleventh Day of May, 2004

JON W. DUDAS
*Acting Director of the United States Patent and Trademark Office*